United States Patent
Deshong et al.

(10) Patent No.: US 11,842,362 B2
(45) Date of Patent: *Dec. 12, 2023

(54) MULTI-MARKET CALIBRATION OF CONVENIENCE PANEL DATA TO REDUCE BEHAVIORAL BIASES

(71) Applicant: The Nielsen Company (US), LLC, New York, NY (US)

(72) Inventors: William Deshong, Baltimore, MD (US); Jonathon Wells, Oldsmar, FL (US); Stephen S. Bell, McHenry, IL (US); Behiye Karayaka, Istanbul (TR)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,171

(22) Filed: Oct. 6, 2022

(65) Prior Publication Data

US 2023/0107456 A1 Apr. 6, 2023

Related U.S. Application Data

(63) Continuation of application No. 16/721,474, filed on Dec. 19, 2019, now Pat. No. 11,468,459, which is a (Continued)

(51) Int. Cl.
*G06Q 10/06* (2023.01)
*G06Q 30/02* (2023.01)
(Continued)

(52) U.S. Cl.
CPC ........... *G06Q 30/0205* (2013.01); *G06N 7/01* (2023.01)

(58) Field of Classification Search
CPC ............................. G06Q 10/06; G06Q 30/02
(Continued)

(56) References Cited

U.S. PATENT DOCUMENTS 7,949,639 B2 5/2011 Hunt et al.
11,468,459 B2 * 10/2022 Deshong ............ G06Q 30/0205
(Continued)

FOREIGN PATENT DOCUMENTS

WO 2010088372 A1 8/2010

OTHER PUBLICATIONS

International Searching Authority, "International Search Report," dated Feb. 21, 2020, in connection with International Patent Application No. PCT/US2019/058829, 3 pages.
(Continued)

*Primary Examiner* — Nga B Nguyen

(57) ABSTRACT

Example methods, apparatus, systems and articles of manufacture to implement calibration of convenience panel data to reduce behavioral bias are disclosed. Disclosed example apparatus include a distribution estimator to determine a first behavioral distribution for first convenience panel data associated with a first market and a measurement period, determine a second behavioral distribution for second convenience panel data associated with a second market and the measurement period, and determine a third behavioral distribution for probabilistic panel data associated with the second market and the measurement period. Disclosed example apparatus also include a distribution calibrator to calibrate the first behavioral distribution determined for the first convenience panel data associated with the first market based on (i) the second behavioral distribution determined for the second convenience panel data associated with the second market and (ii) the third behavioral distribution determined for the probabilistic panel data associated with the second market.

20 Claims, 16 Drawing Sheets

Related U.S. Application Data continuation of application No. PCT/US2019/058829, filed on Oct. 30, 2019.

(60) Provisional application No. 62/753,657, filed on Oct. 31, 2018.

(51) Int. Cl.
*G06Q 30/0204* (2023.01)
*G06N 7/01* (2023.01)

(58) Field of Classification Search
USPC ........................................................ 705/7.34
See application file for complete search history.

(56) References Cited

U.S. PATENT DOCUMENTS

| | | | |
|---|---|---|---|
| 2004/0138958 | A1 | 7/2004 | Watarai et al. |
| 2011/0066464 | A1 | 3/2011 | George |
| 2012/0072940 | A1* | 3/2012 | Fuhrer ................... H04H 60/31 725/13 |
| 2014/0380350 | A1* | 12/2014 | Shankar ........... H04N 21/25883 725/18 |
| 2016/0019580 | A1 | 1/2016 | Rao et al. |
| 2016/0379231 | A1* | 12/2016 | Sheppard ................. G06N 7/01 705/7.33 |
| 2016/0379234 | A1* | 12/2016 | Shah ....................... H04H 60/76 705/7.33 |
| 2017/0004526 | A1* | 1/2017 | Morovati ........... H04N 21/6582 |
| 2017/0011420 | A1* | 1/2017 | Sullivan ............. G06Q 30/0277 |
| 2017/0091789 | A1 | 3/2017 | Palit et al. |
| 2017/0091794 | A1* | 3/2017 | Sheppard ........... G06Q 30/0204 |
| 2017/0187478 | A1* | 6/2017 | Shah ................... H04N 21/8456 |
| 2018/0225709 | A1* | 8/2018 | Ferber .................... G06N 20/00 |

OTHER PUBLICATIONS

International Searching Authority, "Written Opinion," dated Feb. 21, 2020, in connection with International Patent Application No. PCT/US2019/058829, 5 pages.

International Bureau, "International Preliminary Report on Patentability," dated Apr. 27, 2021, in connection with International Patent Application No. PCT/US2019/058829, 6 pages.

European Patent Office, "Extended European Search Report," mailed in connection with EP Patent Application No. 19878292.2, dated Jun. 22, 2022, 10 pages.

European Patent Office, "Communication Pursuant to Rules 70(2) and 70a(2) EPC," mailed in connection with EP Patent Application No. 19878292.2, dated Jul. 12, 2022, 1 page.

United States Patent and Trademark Office, "Non-Final Rejection," dated Jun. 10, 2021, in connection with U.S. Appl. No. 16/721,474, 12 pages.

United States Patent and Trademark Office, "Final Rejection," dated Jan. 20, 2022, in connection with U.S. Appl. No. 16/721,474, 15 pages.

United States Patent and Trademark Office, "Advisory Action (PTOL-303)," dated Mar. 29, 2022, in connection with U.S. Appl. No. 16/721,474, 2 pages.

United States Patent and Trademark Office, "Notice of Allowance and Fee(s) Due," dated Jun. 9, 2022, in connection with U.S. Appl. No. 16/721,474, 12 pages.

United States Patent and Trademark Office, "Notice of Allowance and Fee(s) Due (PTOL-85)," dated Sep. 14, 2022, in connection with U.S. Appl. No. 16/721,474, 2 pages.

\* cited by examiner

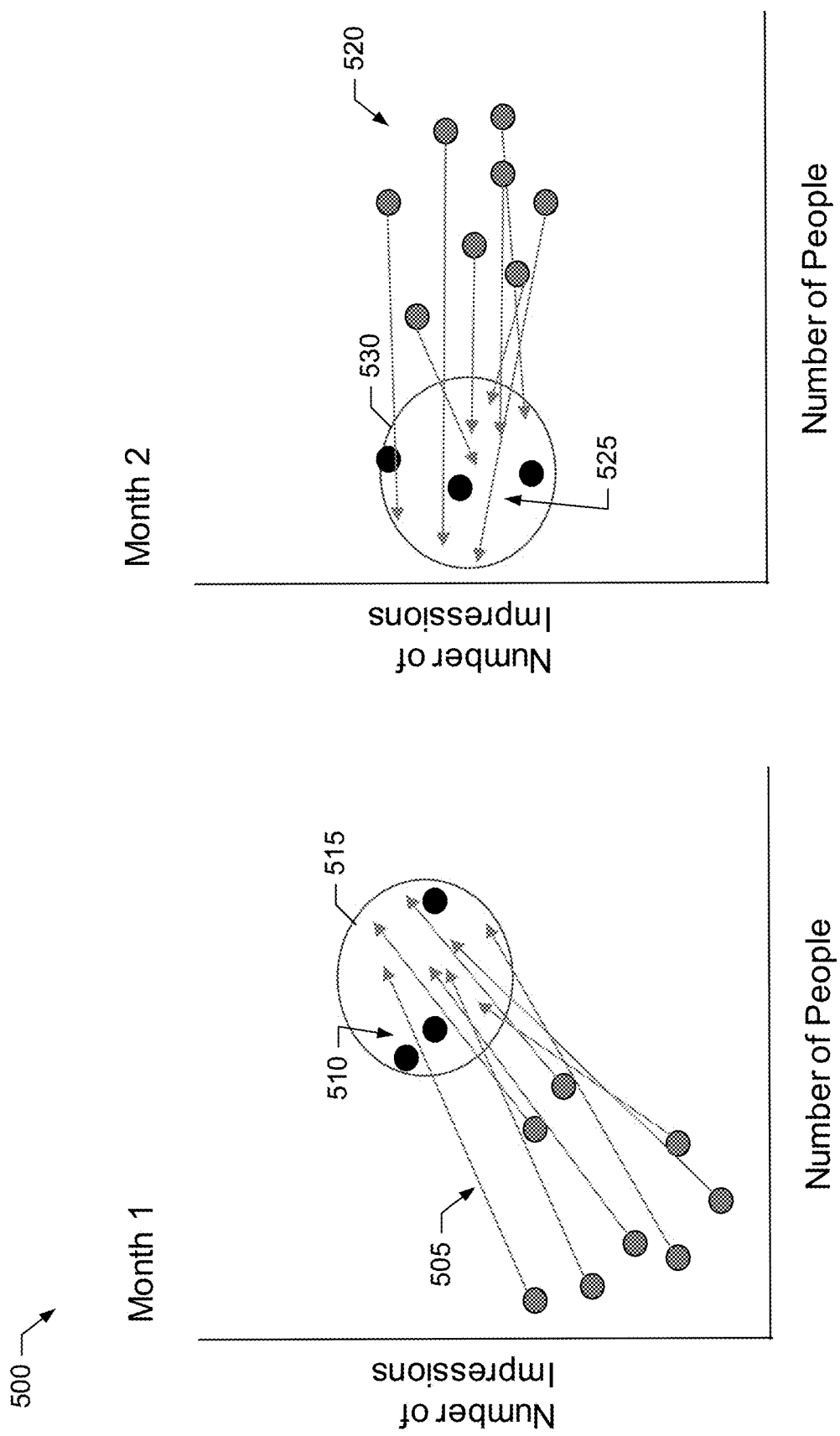

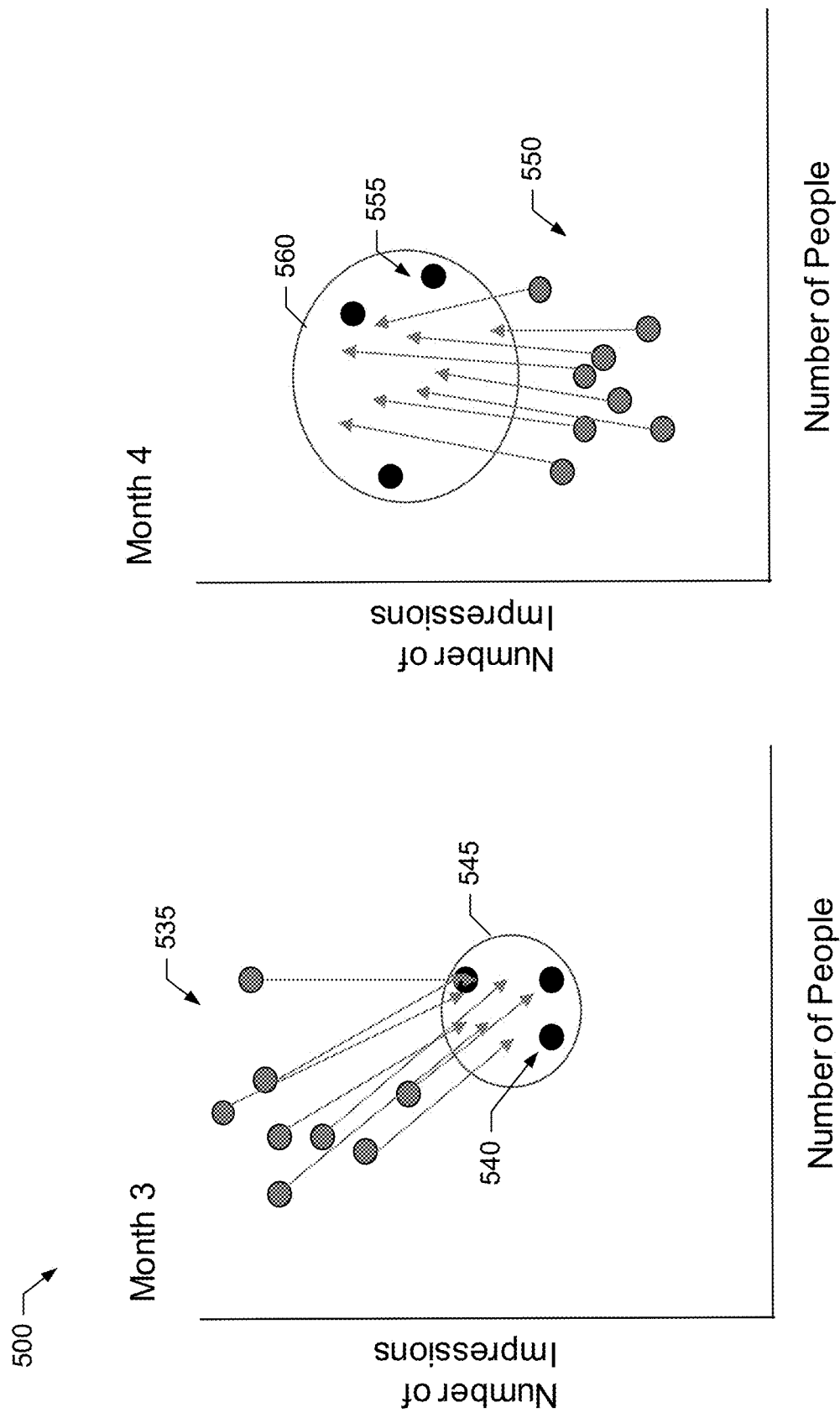

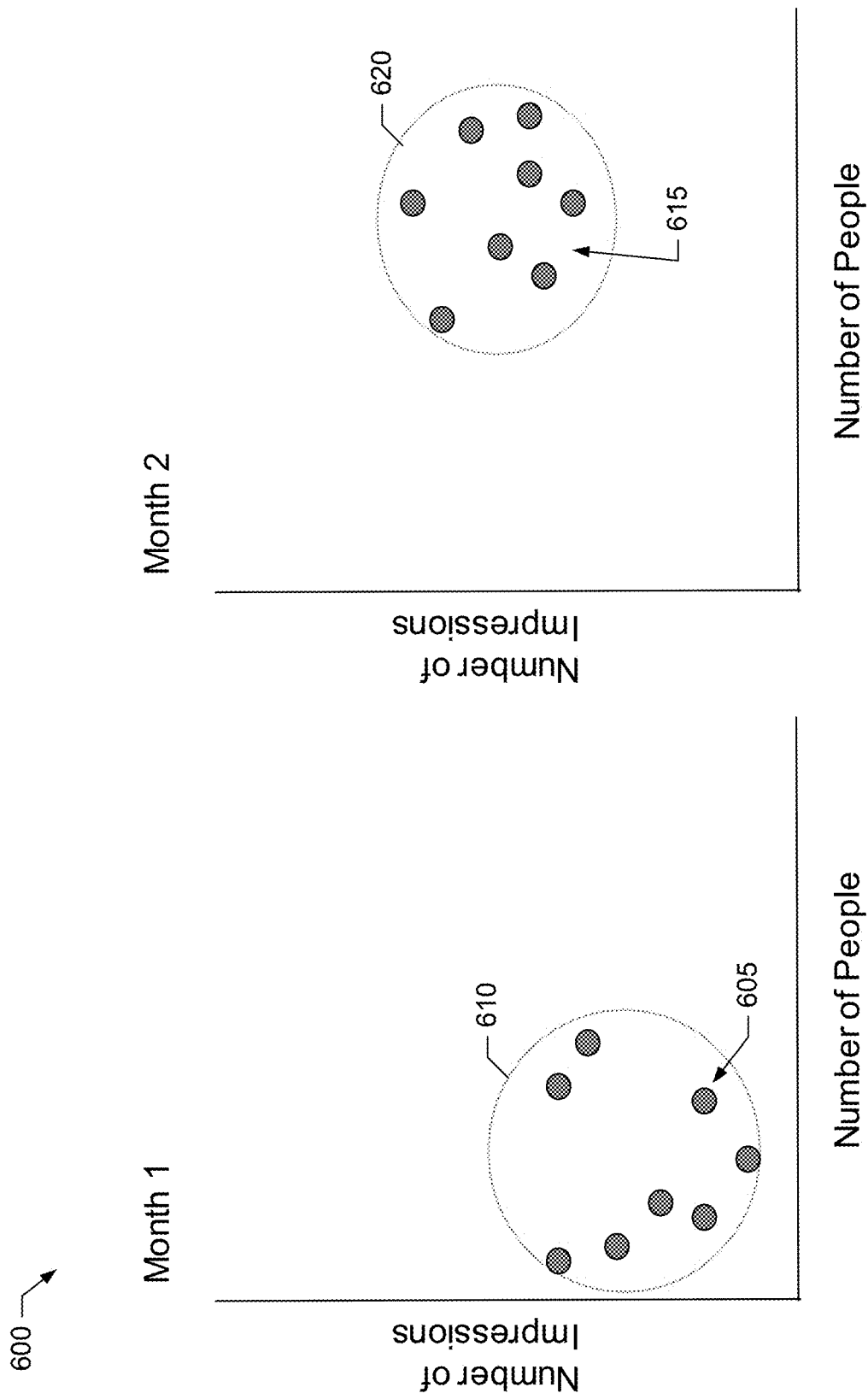

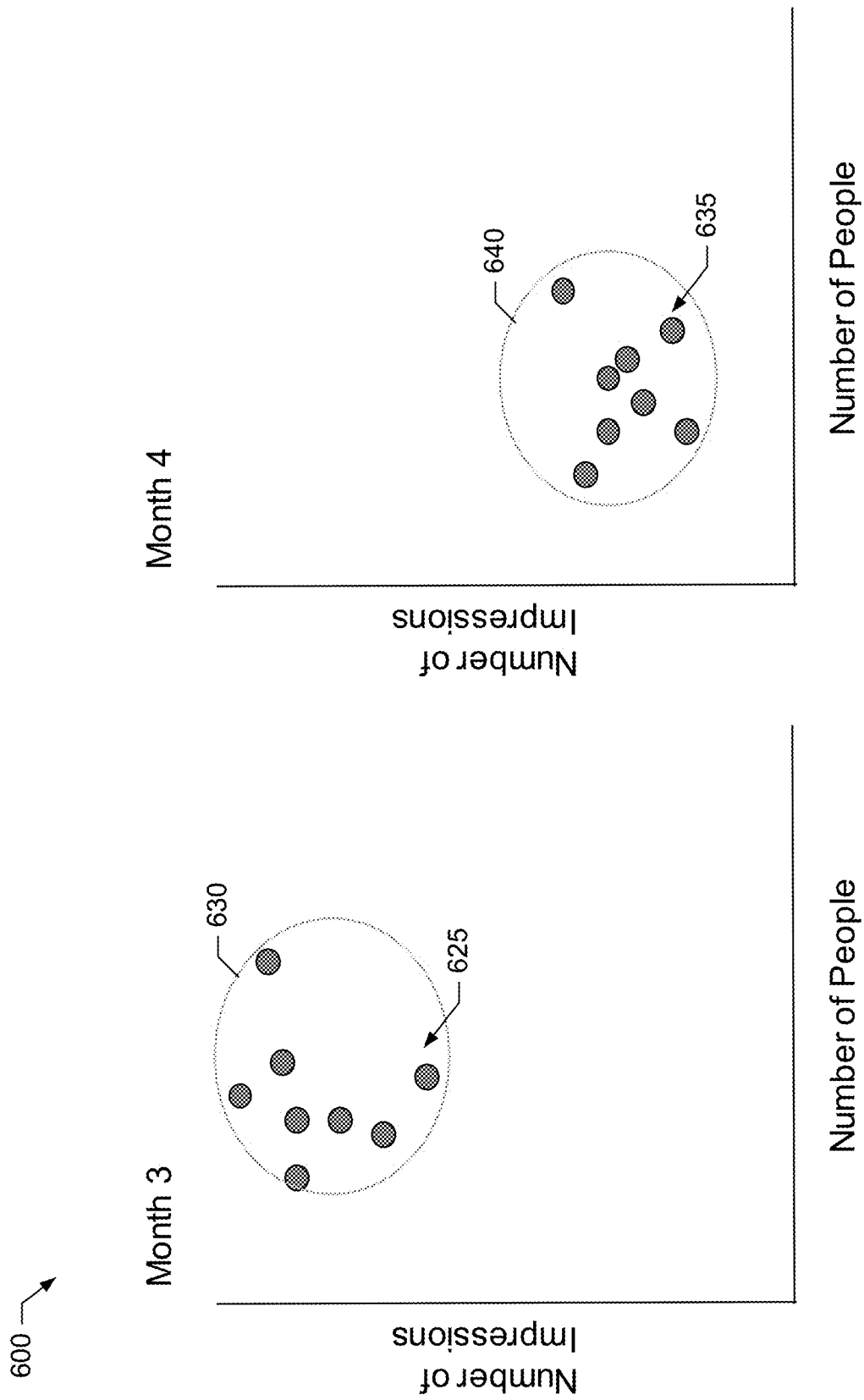

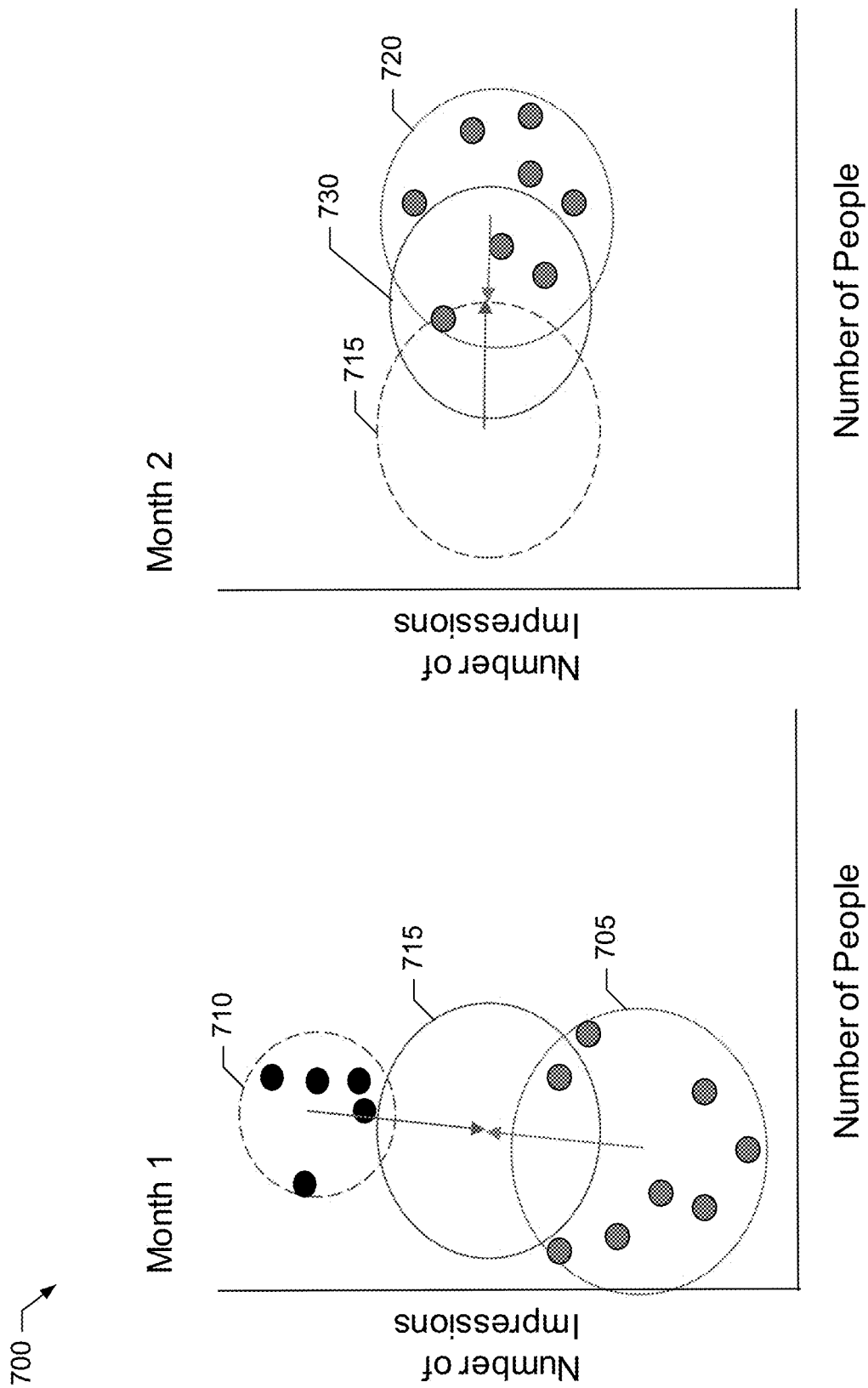

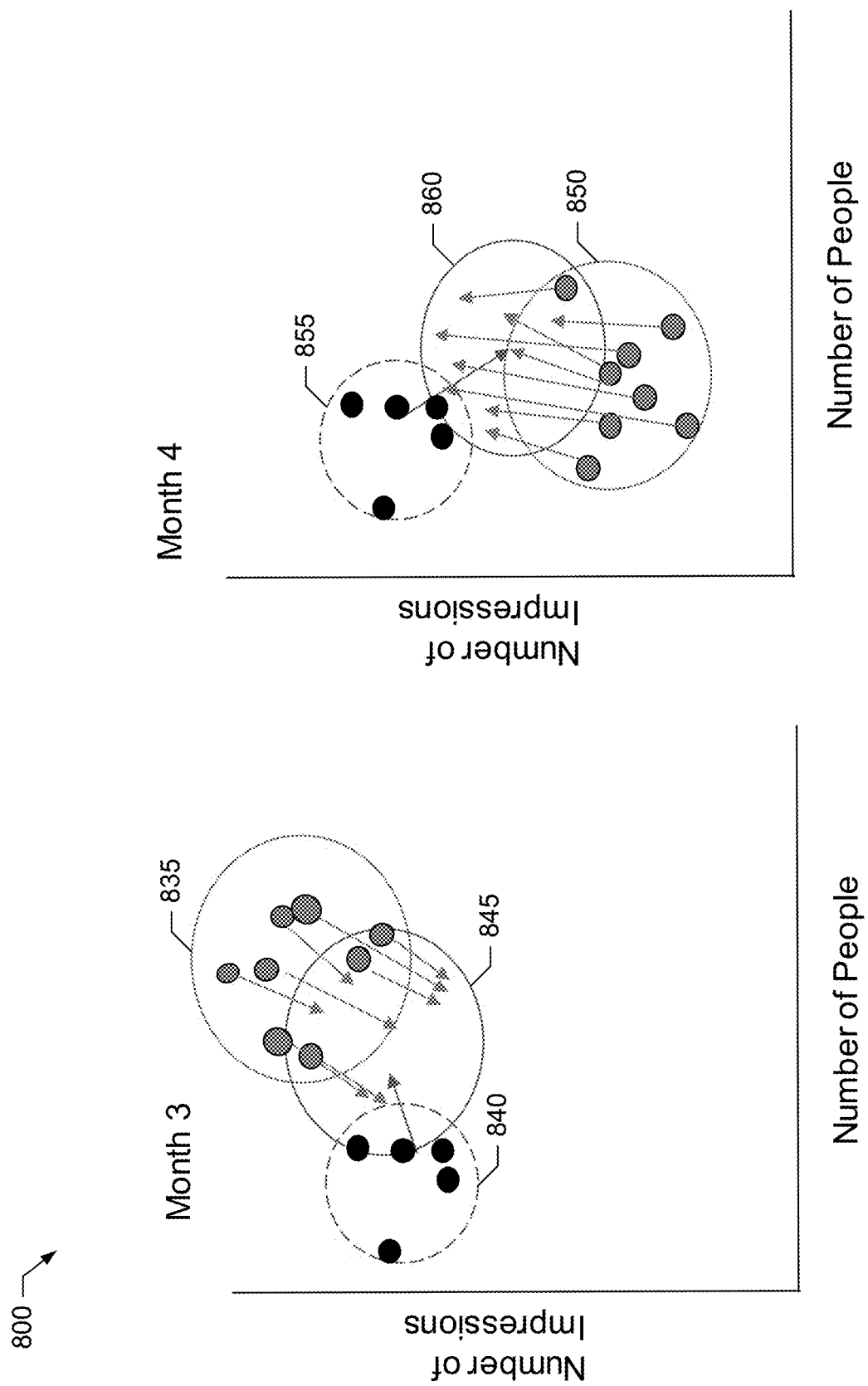

MULTI-MARKET CALIBRATION OF CONVENIENCE PANEL DATA TO REDUCE BEHAVIORAL BIASES

RELATED APPLICATION(S)

This patent arise from a continuation of U.S. patent application Ser. No. 16/721,474, which was filed on Dec. 19, 2019, and is titled "MULTI-MARKET CALIBRATION OF CONVENIENCE PANEL DATA TO REDUCE BEHAVIORAL BIASES," which issued as U.S. Pat. No. 11,468,459, and which is a continuation of International Patent Application No. PCT/US19/58829, which was filed on Oct. 30, 2019, and is titled "MULTI-MARKET CALIBRATION OF CONVENIENCE PANEL DATA TO REDUCE BEHAVIORAL BIASES," which claims the benefit of U.S. Provisional Application No. 62/753,657, which was filed on Oct. 31, 2018, and is titled "MULTI-MARKET PROBABILISTIC SUBSTITUTION USING ITERATIVE LEARNING TO ESTIMATE BEHAVIORAL BIASES." Priority to U.S. patent application Ser. No. 16/721,474, International Patent Application No. PCT/US19/58829 and U.S. Provisional Application No. 62/753,657 is claimed. U.S. patent application Ser. No. 16/721,474, International Patent Application No. PCT/US19/58829 and U.S. Provisional Application No. 62/753,657 are incorporated herein by reference in their respective entireties.

FIELD OF THE DISCLOSURE

This disclosure relates generally to audience measurement and, more particularly, to multi-market calibration of convenience panel data to reduce behavioral biases.

BACKGROUND

Some audience measurement systems for measuring audiences of online media (e.g., website visits, online advertisements, online programming, etc.) utilize impression data obtained from probabilistic panels and/or convenience panels. Probabilistic panels can include individuals, households, etc., who are recruited (e.g., via telephone and/or in-person interviews) to meet specified demographic targets (e.g., corresponding to a demographic distribution of a target population). Probabilistic panels can provide an accurate, granular truth data set that represents behaviors of individuals (and thus demographic groups) in the panel. However, probabilistic panels may have small samples sizes and may be expensive to maintain. In contrast, convenience panels can include individuals, households, etc., who are included in a panel opportunistically, such as in response to an online prompt to join the panel. Behavioral information for panelists in a convenience panel may be known or unknown, can be biased towards some behaviors, and/or not representative of a target population. However, convenience panels may have large sample sizes and may be relatively inexpensive to maintain.

BRIEF DESCRIPTION OF THE DRAWINGS

FIGS. 5A-5D illustrate a first example technique for calibrating behavioral distributions determined for convenience panel data associated with a first market based on behavioral distributions determined for probabilistic panel data associated with the first market.

FIGS. 6A-6D illustrate a second example technique for determining behavioral distributions for convenience panel data associated with the first market.

FIGS. 7A-7D illustrate a third example technique for iteratively calibrating behavioral distributions determined for convenience panel data associated with a first market based on an initial behavioral distribution determined for probabilistic panel data associated with a second market different from the first market.

FIGS. 8A-8D illustrate a fourth example technique for calibrating behavioral distributions determined for convenience panel data associated with a first market based on behavioral distributions determined for probabilistic panel data and convenience panel data associated with a second market different from the first market.

The figures are not to scale. In general, the same reference numbers will be used throughout the drawing(s) and accompanying written description to refer to the same or like parts, elements, etc.

Figure 1:
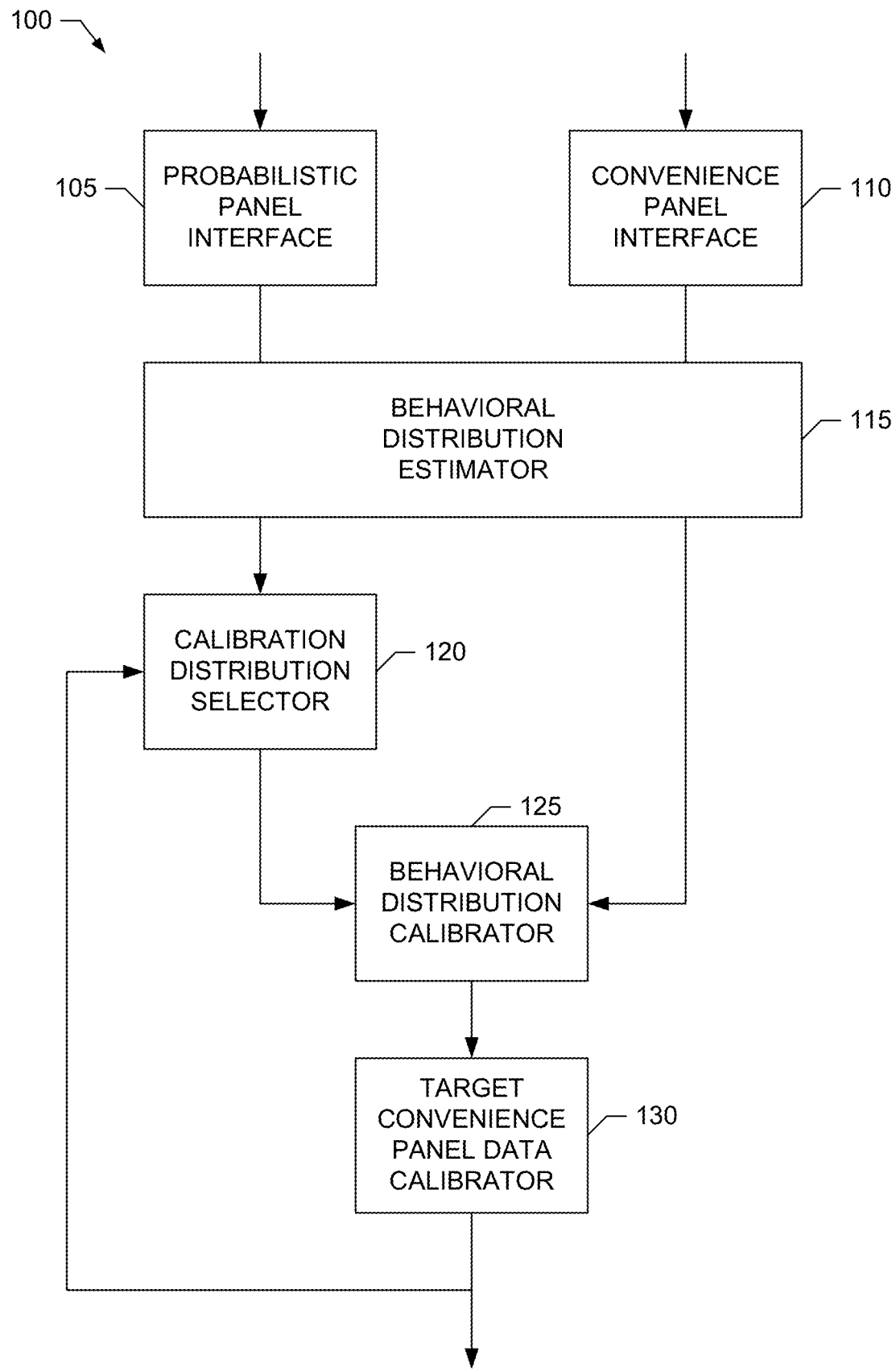
FIG. 1 is a block diagram of an example audience measurement system implementing multi-market calibration of convenience panel data using probabilistic substitution with iterative learning to reduce behavioral bias in accordance with teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to implement multi-market calibration of convenience panel data to reduce behavioral bias are disclosed herein. As noted above, some audience measurement systems for measuring audiences of online media (e.g., website visits, online advertisements, online programming, etc.) utilize impression data obtained from probabilistic panels and/or convenience panels. Probabilistic panels can include individuals, households, etc., who are recruited (e.g., via telephone and/or in-person interviews) to meet specified demographic targets (e.g., corresponding to a demographic distribution of a target population). Panelists in a probabilistic panel may agree to provide detailed demographic information to an audience measurement entity (AME) managing the panel. Panelists in a probabilistic panel may also agree to the use of metering devices and/or installed metering applications to monitor their access of and/or interaction with online media. Thus, probabilistic panels can provide an accurate, granular truth data set that represents behaviors of individuals in the panel. However, probabilistic panels may have small samples sizes and may be expensive to maintain. In contrast, convenience panels can include individuals, households, etc., who are included in a panel opportunistically, such as in response to an online prompt, banner, etc., to join the panel. For example, websites serving the online media may prompt users to agree to have their access information provided to a convenience panel, and may prompt the users to enter demographic information. In some examples, demographic information for panelists in a convenience panel may be known, unknown and/or unverified, may be biased towards some demographics, and/or may not be representative of a target population. However, convenience panels may have large sample sizes and may be relatively inexpensive to maintain.

To take advantage of the relative strengths of probabilistic panel data and convenience panel data while deemphasizing their respective weaknesses, some audience measurement systems combine probabilistic panel data and convenience panel data to obtain an overall measurement data set or, in other words, a target panel data set for a given market. For example, some such audience measurement systems combine the probabilistic panel data and convenience panel data based on demographics and/or geographic information, such as through demographic weighting or geodemographic weighting. To perform such combining, some such audience measurement systems determine demographic distributions for a population in a given market based on both the available probabilistic panel data and the available convenience panel data for the given market. Because the probabilistic panel data is intended to be an accurate representation of the population in the given market, it can be combined with the convenience panel data to reduce or otherwise calibrate for the potential bias associated with the convenience panel data while taking advantage of the increased sample size afforded by the convenience data panel. However, as noted above, probabilistic panels can be expensive to maintain. Also, in some markets, it may be difficult to recruit an adequate number of panelists to be representative of the target population and, thus, some demographic categories may be underrepresented such that demographic weighting alone (or in combination with location-based weighting) is unable to adequately reduce the bias associated with the convenience panel data. Thus, in some markets, the probabilistic panel data may not have adequate quality (e.g., in terms of representing the demographics of the target population with respective target sample sizes) to correct the bias associated with the convenience panel data in those markets.

Example audience measurement systems disclosed herein provide technical solutions to the technical problems associated with unrepresentative probabilistic panel data for a given market. In particular, disclosed example audience measurement systems implement multi-market calibration of convenience panel data to reduce behavioral bias. To solve the problem of unrepresentative probabilistic panel data for a given market, some disclosed example audience measurement systems utilize behavior characteristics, such as in the form of behavior distributions, to calibrate convenience panel data. For example, some disclosed example audience measurement systems utilize a behavioral distribution determined for probabilistic panel data from another market (e.g., referred to herein as a calibration market) as an initial seed to calibrate a behavioral distribution determined for convenience panel data associated with the given target market. Such disclosed example audience measurement systems then iteratively combine the calibrated behavioral distribution determined from a prior iteration (which was initially seeded with the probabilistic panel behavior distribution determined for the calibration market) with a new behavior distribution determined for the convenience panel data from the given target market to determine a new calibrated behavioral distribution for the convenience panel data in the given target market. The resulting calibrated behavioral distribution can then be output for use as input to downstream audience measurement processing stages that utilize audience distributions determined for the given target market. The calibrated behavioral distribution determined for the current processing iteration is also used as the initial behavioral distribution for the next processing iteration. In this way, a higher quality probabilistic panel behavioral distribution for a different market (e.g., the calibration market) can be used to seed the calibration process used to calibrate the convenience panel data in the given target market, with any potential differences between the characteristics of the probabilistic panel for the other calibration market and the characteristics of the given target market diminishing over time with each processing iteration.

Some disclosed example audience measurement systems calibrate the convenience panel data for a given market and measurement interval (e.g., monthly or some other time period) using probabilistic panel data and convenience panel data obtained for that measurement interval from one or more other calibration markets. For example, and as disclosed in further detail below, some such audience measurement systems may determine, for a given measurement interval, a behavioral distribution for the convenience panel data from the given target market, a behavioral distribution for the probabilistic panel data from the calibration market, and a behavioral distribution for the convenience panel data from the calibration market. As described in further detail below, a behavioral distribution may represent counts of individuals (such as counts of panelists in a probabilistic panel, counts of panelists in a convenience panel, counts of people in a population of interest, etc.) associated with different behavior categories. Some disclosed example audience measurement systems then calibrate, for a given measurement interval, the behavioral distribution for the convenience panel data from the given target market using the behavioral distribution for the probabilistic panel data from the calibration market and the behavioral distribution for the convenience panel data from the calibration market. Some such audience measurement systems may then output the resulting calibrated behavioral distribution for the convenience panel data from the given target market, and/or apply the calibrated behavioral distribution to the convenience panel data to generate audience measurement data associated with online media access/exposure in the target market.

Turning to the figures, a block diagram of an example audience measurement system 100 implementing multi-market calibration of convenience panel data to reduce behavioral bias in accordance with teachings of this disclosure is illustrated in FIG. 1. The example audience measurement system 100 includes an example probabilistic panel interface 105, an example convenience panel interface 110, an example behavioral distribution estimator 115, an example calibration distribution selector 120, an example behavioral distribution calibrator 125 and an example target convenience panel data calibrator 130. In the illustrated example, the probabilistic panel interface 105 is structured to obtain probabilistic panel data by interfacing (e.g., via a network) with a first impression monitoring system generating online media impression data for panelists in a probabilistic panel of a target market and/or generating online media impression data for panelists in probabilistic panel(s) of one or more calibration markets. The impression data may correspond to, for example, counts of one or more different websites or web pages visited by respective ones of the panelists in a given probabilistic panel, counts of one or more different online advertisements viewed by respective ones of the panelists in a given probabilistic panel, counts of one or more different online media programs accessed by respective ones of the panelists in a given probabilistic panel, etc.

In the illustrated example, the convenience panel interface 110 is structured to obtain convenience panel data by interfacing (e.g., via a network) with a second impression monitoring system generating online media impression data for panelists in a convenience panel of a target market and/or generating online media impression data for panelists in convenience panel(s) of one or more calibration markets. The impression data may correspond to, for example, counts of one or more different websites visited by respective ones of the panelists in a given convenience panel, counts of one or more different online advertisements viewed by respective ones of the panelists in a given convenience panel, counts of one or more different online media programs accessed by respective ones of the convenience in a given convenience panel, etc. In some examples, the convenience panel data obtained by the convenience panel interface 110 is limited to impression data that is aggregated across the panelists in the convenience panel. In some examples, the market for which convenience panel data is obtained by the convenience panel interface 110 may be the same as, or different from, the market for which probabilistic panel data is obtained by the probabilistic panel interface 105. For example, the market for the convenience panel data may be a first, target market of interest for which audience measurement data is being determined, whereas the market for the probabilistic panel data may be a second, calibration market different from the first market, which is characterized as having better quality panel data than is available in the first market.

In the illustrated example, the behavioral distribution estimator 115 is structured to determine respective behavioral universe estimate (UE) distributions for the probabilistic panel data obtained by the probabilistic panel interface 105 and for the convenience panel data obtained by the convenience panel interface 110. In some examples, a behavioral UE represents a total number of behavior-related events in a target population. In some such examples, a marginal behavioral UE represents a fraction of the total number of behavior-related events in the target population that are associated with a set of one or more panelist, behavior-related characteristics (or categories) associated with a given margin. In some such examples, a behavioral UE distribution represents the collection of marginal behavioral UEs for the given target population. In some such examples, a behavioral UE distribution corresponds to a UE distribution in which the panelist characteristics/categories of the UE margins are based on panelist behaviors relative to accessing the online media (e.g., such as number/frequency of website visits in a measurement period, number/frequency of online advertisements accessed in a measurement period, number/frequency of online media (e.g., programs, movies, clips, etc.) accessed in a measurement period, etc.). This is in contrast with a demographic UE distribution, which corresponds to a UE distribution in which UE and marginal UEs represent numbers of individuals (rather than events) in the population, and the characteristics/categories of the UE margins are based on panelist demographics (e.g., such as age, gender, income, etc.).

An example of a behavioral UE distribution determined by the example behavioral distribution estimator 115 for probabilistic panel data obtained by the probabilistic panel interface 105 is illustrated in Table 1. In Table 1, the behavioral UE distribution represents the total counts of panelists who visited search engines/portals and communities in a given market (e.g., the U.S. market) in a given measurement period (e.g., 1 month) and in different behavioral categories corresponding to different frequencies of accessing websites in the given measurement period. Thus, in the example of Table 1, the behavioral distribution estimator 115 is configured to determine a probabilistic panel behavioral UE distribution in which the marginal behavioral UEs of the distribution represent the sizes of different groups of panelists having different frequencies with which the panelists access the search engines/portals and communities in the given market. For example, the behavioral distribution estimator 115 may rank the website visits for different panelists in order of the frequencies with which the different panelists access the monitored websites over the measurement period and then divide the ranked website visits into quartiles (e.g., fourths). In the example of Table 1, the $1^{st}$ Quartile corresponds to the number of panelists falling into the lowest quartile of website visit frequency, whereas the $4^{th}$ Quartile corresponds to the number of panelists falling into the highest quartile of website visit frequency. In the example of Table 1, the marginal behavioral counts are also weighted based on one or more demographic characteristics to represent the demographics of the population. In the example of Table 1, the behavioral distribution estimator 115 also determines marginal behavioral counts representative of panelists that accessed websites in the measurement period but not those monitored websites in the category of interest (corresponding to NO VISIT in Table 1) and panelists that were online but had no browser activity in the measurement period (corresponding to INACTIVE in Table 1). As shown in Table 1, the behavioral distribution estimator 115 can be configured to determine the behavioral UE distribution as relative percentages (as shown in the last column of the table).

TABLE 1

| | | Weighted Estimate | Weighted Distribution |
|---|---|---|---|
| Search Engines/ Portals & Communities | NO VISIT | 35539155 | 13.61% |
| | 1st QUARTILE | 45870421 | 17.57% |
| | 2nd QUARTILE | 46043828 | 17.63% |
| | 3rd QUARTILE | 45347714 | 17.37% |
| | 4th QUARTILE | 45515594 | 17.43% |
| | INACTIVE | 42796402 | 16.39% |

To implement multi-market calibration of convenience panel data to reduce behavioral bias, the behavioral distribution estimator 115 of the illustrated example determines a behavioral distribution, such as a distribution like the example illustrated in Table 1, for convenience panel data obtained for a first, target market of interest during a first measurement interval. For example, the target market may correspond to a European Union (EU) country, and the first measurement interval may correspond to a given month, such as the current month. The behavioral distribution estimator 115 of the illustrated example also determines a behavioral distribution, such as a distribution like the example illustrated in Table 1, for probabilistic panel data obtained for a second, calibration market during the first measurement interval. For example, the second market may correspond to the United States (U.S.). The calibration distribution selector 120 of the illustrated example then selects the probabilistic panel behavioral distribution for the second market to be an initial distribution (e.g., to be a seed) for use in iteratively determining subsequent target behavioral distributions for use in audience measurement in the first market.

The behavioral distribution calibrator 125 of the illustrated example then combines the initial calibration behavioral distribution (which is the probabilistic panel behavioral distribution for the second market) with the convenience panel behavioral distribution determined by the behavioral distribution estimator 115 for the target market to determine a new (posterior) target behavioral distribution for the first market to be used to determine audience measurement data associated with the first measurement period and the first market. For example, the behavioral distribution calibrator 125 may combine the initial calibration behavioral distribution for the calibration market with the convenience panel behavioral distribution for the target market by weighting the initial calibration behavioral distribution (e.g., by weighting the individual marginal counts of the initial calibration behavioral distribution) and weighting the convenience panel behavioral distribution (e.g., by weighting the individual marginal counts of the convenience panel behavioral distribution) and then combining the weighted distributions (e.g., by combining respective weighting marginal counts from the two distributions) to determine a new (posterior) target behavioral distribution for the target market. In some examples, the weights can be set to be equal (e.g., such as to a value of 0.5) to cause the initial calibration behavioral distribution and the convenience panel behavioral distribution to contribute equally to the combination. In some examples, the weights for the initial calibration behavioral distribution may be different than the weights for the convenience panel behavioral distribution to cause one distribution to contribute more to the combination than the other distribution.

In the illustrated example of FIG. 1, the target convenience panel data calibrator 130 reports the new (posterior) target behavioral UE distribution determined by the behavioral distribution calibrator 125 for the target market and first measurement period to downstream audience measurement processing. In some examples, the target convenience panel data calibrator 130 may also use the new (posterior) target behavioral UE distribution determined for the target market and first measurement period to calibrate (e.g., weight) convenience panel data obtained by the convenience panel interface 110 for the target market during the first measurement period to reduce behavioral bias present in the convenience panel data obtained for the first market. In some examples, the downstream audience measurement processing may use the calibrated convenience panel data and/or the target behavioral UE distribution reported by the target convenience panel data calibrator 130 for the target market and first measurement period to determine audience estimate(s) (e.g., ratings, reach, impressions, etc.) for online media in the target market.

In the illustrated example, the target convenience panel data calibrator 130 also provides the new (posterior) target behavioral distribution determined for the target market and first measurement period to the calibration distribution selector 120, which selects that distribution to be the initial calibration behavioral distribution for the next processing iteration corresponding to the next measurement period. Then, during the next processing iteration corresponding to the next measurement period, the behavioral distribution estimator 115 of the illustrated example determines a convenience panel behavioral distribution for the target market of interest and for the next measurement period (e.g., the next month). The behavioral distribution calibrator 125 then combines the target behavioral distribution from the prior measurement period and the convenience panel behavioral distribution for the next measurement period to determine a new (posterior) target behavioral distribution for the next measurement period. This iterative processing continues with the new (posterior) target behavioral distribution determined during one iteration becoming the initial calibration behavioral distribution to be used during the next processing iteration. Thus, in the illustrated example of FIG. 1, the probabilistic panel behavioral distribution for the calibration market serves as a probabilistic starting point for calibrating future target behavioral distributions that are to be weighted and combined with convenience panel behavioral distributions associated with future measurement periods in the target market to determine new target behavioral distributions to be used for audience measurement calculations associated with those future measurement periods. However, the influence of the calibration market's data lessens with each processing iteration.

As mentioned above, the behavioral distributions determined by the behavioral distribution estimator 115 may be weighted based on one or more demographic characteristics of a population, and the resulting new (posterior) target behavioral distributions determined by the audience measurement system 100 may be used in downstream audience measurement processing. An example of such an overall audience measurement process is as follows:

1. Obtain demographic UEs for the target market of interest (e.g., the first market).

2. Weight the probabilistic panel data for the calibration market (e.g., the second market) based on the demographic UEs.

3. Use the weighted probabilistic panel data as input for the first processing iteration in the audience measurement system 100, as described above.

4. Combine the convenience panel data for the target market with probabilistic panel data for the target market (if the latter is available)

5. Weight the convenience panel data (or combined panel data determined from step 4) for the target market based on the demographic UEs and the new (posterior) target behavioral distribution determined by the audience measurement system 100 for the current measurement period.

6. Determine and report audience measurement metrics based on the weighted, convenience panel data (or the weighted, combined panel data, if available) from step 5.

Figure 2:
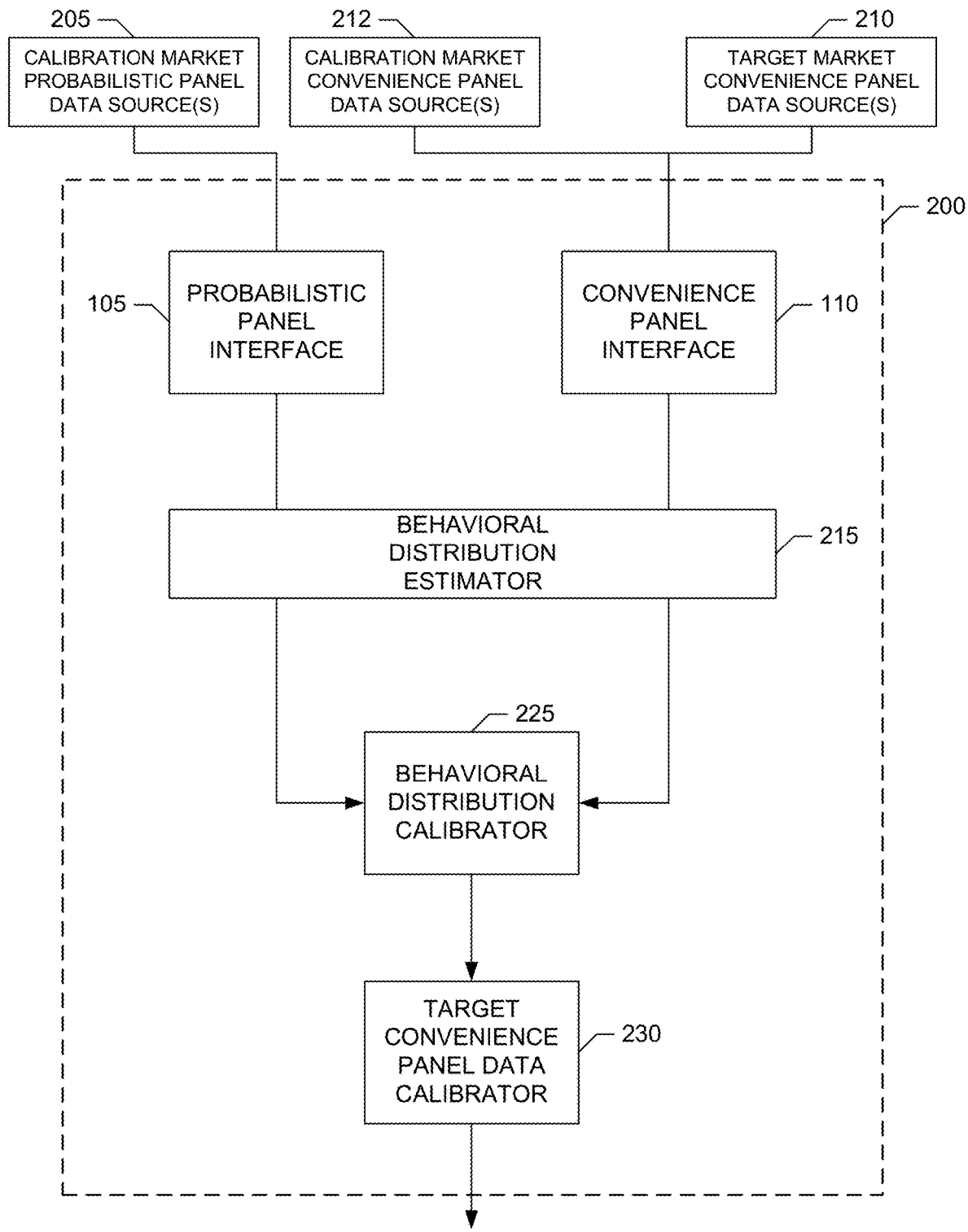
FIG. 2 is a block diagram of a second example audience measurement system implementing multi-market calibration of convenience panel data to reduce behavioral bias in accordance with teachings of this disclosure.

A block diagram of a second example audience measurement system 200 implementing multi-market calibration of convenience panel data to reduce behavioral bias in accordance with teachings of this disclosure is illustrated in FIG. 2. The example audience measurement system 200 is structured to calibrate convenience panel data (also referred to herein as a convenience sample) obtained for a target market by creating behavioral targets for the target market of interest (also referred to as market A in the following description) using (i) geo-demographically weighted convenience panel data from market A and (ii) a relationship of a reweighted probabilistic panel behavioral distribution (also referred to herein as a probabilistic sample behavioral distribution) to a reweighted convenience panel behavioral distribution (also referred to herein as a convenience sample behavioral distribution) in one or more calibration markets (also referred to as markets B, C, . . . , in the following description). For example, market A may correspond to a target country of interest for which convenience panel data is to be calibrated, market B may correspond to a first calibration market, such as a first calibration country, to be used to calibrate the convenience panel data for market A, and markets C, D, E, . . . , may correspond to other calibration markets, such as other calibration countries, to be used to calibrate the convenience panel data for market A. The example audience measurement system 200 then weights the convenience panel data in market A based on existing geodemographic controls and the behavioral targets determined via the aforementioned calibration process to obtain calibrated convenience panel data in market A, which can be used to determine online media audience estimate(s) (e.g., ratings, reach, impressions, etc.) with reduced behavioral bias relative to uncalibrated convenience panel data.

Turing to FIG. 2, similar to the example audience measurement system 100 of FIG. 1, the example audience measurement system 200 includes the example probabilistic panel interface 105, the example convenience panel interface 110, an example behavioral distribution estimator 215, an example behavioral distribution calibrator 225 and an example target convenience panel data calibrator 230. In the illustrated example of FIG. 2, the probabilistic panel interface 105 is structured, as described above, to interface (e.g., via one or more networks) with one or more example calibration market probabilistic panel data source(s) 205. In the illustrated example, the calibration market probabilistic panel data source(s) 205 provide probabilistic panel data for one or more calibration markets, which are different from the target market for which convenience panel data is to be calibrated. For example, the probabilistic panel interface 105 may interface with one or more impression monitoring system(s) that include metering devices and/or monitoring applications that interface with and/or execute on computing devices of probabilistic panelists in the one or more calibration markets to generate online media impression data. Additionally or alternatively, in some examples, the probabilistic panel interface 105 may interface (e.g., via one or more networks) with the metering devices and/or monitoring applications that interface with and/or execute on computing devices of the probabilistic panelists in the one or more calibration markets to obtain the online media impression data. Examples of impression data are described above.

In the illustrated example of FIG. 2, the convenience panel interface 110 is structured, as described above, to interface (e.g., via one or more networks) with one or more example target market convenience panel data source(s) 210 and one or more example calibration market convenience panel data source(s) 212. In the illustrated example, the target market convenience panel data source(s) 210 provide convenience panel data for a given target market of interest for which convenience panel data is to be calibrated. For example, the convenience panel interface 110 may interface with one or more impression monitoring system(s) that interface with websites serving online media in the target market to obtain online media impression data provided by those websites (e.g., which is obtained from users in the target market in response to prompts from the websites when the users access online media from the websites). Additionally or alternatively, in some examples, the convenience panel interface 110 may interface (e.g., via one or more networks) with the websites serving online media in the target market to obtain the online media impression data from the websites. Similarly, the calibration market convenience panel data source(s) 212 provide convenience panel data for one or more calibration markets, which are different from the target market for which convenience panel data is to be calibrated. For example, the convenience panel interface 110 may interface with one or more impression monitoring system(s) that interface with websites serving online media in the convenience market(s) to obtain online media impression data provided by those websites (e.g., which is obtained from users in the convenience market(s) in response to prompts from the websites when the users access online media from the websites). Additionally or alternatively, in some examples, the convenience panel interface 110 may interface (e.g., via one or more networks) with the websites serving online media in the convenience market(s) to obtain the online media impression data from the websites. Examples of impression data are described above.

The example audience measurement system 200 includes the example behavioral distribution estimator 215, which may be similar to the example behavioral distribution estimator 115 of FIG. 1. In the illustrated example of FIG. 2, the example behavioral distribution estimator 215 is structured to determine behavioral distribution(s) for the probabilistic panel data obtained by the probabilistic panel interface 105 for the calibration market(s) (e.g., obtained from the calibration market probabilistic panel data source(s) 205). The behavioral distribution estimator 215 is also structured to determine respective behavioral distributions for the convenience panel data obtained by the convenience panel interface 110 for the calibration market(s) (e.g., obtained from the calibration market convenience panel data source(s) 212) and for the target market (e.g., obtained from the target market convenience panel data source(s) 210). An example implementation of the behavioral distribution estimator 215 of FIG. 2 is illustrated in FIG. 3.

Figure 3:
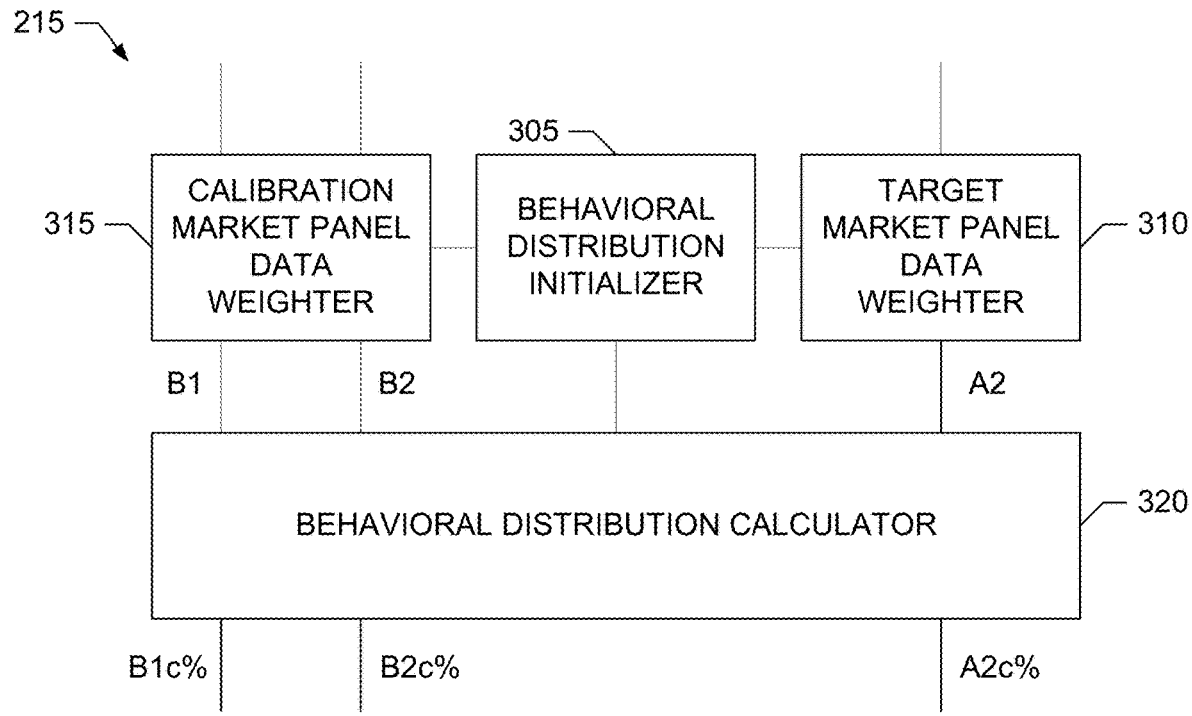
FIG. 3 is a block diagram of an example behavioral distribution estimator included in the example audience measurement system of FIG. 2.

Turning to FIG. 3, the behavioral distribution estimator 215 of the illustrated example includes an example behavioral distribution initializer 305, an example target market panel data weighter 310, an example calibration market panel data weighter 315, and an example behavioral distribution calculator 320. The behavioral distribution initializer 305 is structured to define behavioral control variables, also referred to as behavioral categories, for which calibration targets (e.g., corresponding to a calibrated convenience panel distribution) are to be determined for the target market, referred to as market A in the following description. By way of example, the behavioral categories defined by the behavioral distribution initializer 305 could correspond to the behavioral categories specified in Table 1, which correspond to different panelist quartiles associated with different frequencies with which panelists in market A access websites being monitored. In some examples, the behavioral distribution initializer 305 defines the behavioral categories for which calibration targets are to be determined based on user input, one or more configuration scripts, etc.

In the illustrated example, the behavioral distribution initializer 305 is also structured to obtain geodemographic weighting controls to be used to initially weight the convenience panel data for target market A before behavioral-based calibration is performed. For example, the behavioral distribution initializer 305 may obtain demographic weighting controls that define one or more demographic targets that the convenience panel data for target market A is to be weighted to meet. For example, the demographic targets can correspond to target age distributions, gender distributions, income distributions, education level distributions, etc., or any combination thereof, representative of the population in market A. Additionally or alternatively, the behavioral distribution initializer 305 may obtain location weighting controls that define one or more location targets that the convenience panel data for target market A is to be weighted to meet. For example, the location targets can correspond to target population sizes in different geographic regions of market A. In some examples, the behavioral distribution initializer 305 obtains the demographic weighting controls and/or the location weighting controls from one or more data sources, such as governmental population census source(s), market research source(s), etc.

In the illustrated example, the target market panel data weighter 310 weights the convenience sample (or, in other words, the convenience panel data) for target market A to correspond to the geodemographic weighting controls obtained by the behavioral distribution initializer 305 for target market A. For example, convenience sample for target market A may include demographic and/or location data associated with the impression data included in the panelist entries represented in the convenience sample. In some such examples, the target market panel data weighter 310 may scale, replicate, remove, etc., ones of the panelist entries included in the convenience sample for target market A such that the resulting contributions of impressions for different demographic and/or location categories correspond to the geodemographic weighting controls obtained by the behavioral distribution initializer 305 for target market A. By way of example, the target market panel data weighter 310 may weight (e.g., scale, replicate and/or remove) panelist entries in the convenience sample for target market A that correspond to a first demographic category to match a demographic weighting control obtained by the behavioral distribution initializer 305 for that first demographic category in market A. Similarly, the market panel data weighter 310 may weight (e.g., scale, replicate and/or remove) panelist entries in the convenience sample for target market A that correspond to a second demographic category to match a demographic weighting control obtained by the behavioral distribution initializer 305 for that second demographic category in market A, and so on for different demographic weighting controls obtained by the behavioral distribution initializer 305 for market A. Additionally or alternatively, the market panel data weighter 310 may perform similar weighting for different location categories represented in the convenience sample based on respective location weighting controls obtained by the behavioral distribution initializer 305.

In the following description, the resulting weighted convenience sample determined by the target market panel data weighter 310 for target market A is referred to as the target market convenience sample A2.

In the illustrated example, the calibration market panel data weighter 315 weights the probabilistic sample (or, in other words, the probabilistic panel data) for calibration market B to correspond to the demographic weighting controls obtained by the behavioral distribution initializer 305 for target market A. For example, probabilistic sample for calibration market B may include demographic data associated with the impression data included in the panelist entries represented in the probabilistic sample. In some such examples, the calibration market panel data weighter 315 may scale, replicate, remove, etc., ones of the panelist entries included in the probabilistic sample for calibration market B such that the resulting contributions of impressions for different demographic categories correspond to the demographic weighting controls obtained by the behavioral distribution initializer 305 for target market A. By way of example, the calibration market panel data weighter 315 may weight (e.g., scale, replicate and/or remove) panelist entries in the probabilistic sample for calibration market B that correspond to a first demographic category to match the weighting control obtained by the behavioral distribution initializer 305 for that demographic category in target market A. Similarly, the calibration market panel data weighter 315 may weight (e.g., scale, replicate and/or remove) panelist entries in the probabilistic sample for calibration market B that correspond to a second demographic category to match the weighting control obtained by the behavioral distribution initializer 305 for that demographic category in market A, and so on for different demographic categories obtained by the behavioral distribution initializer 305 for market A.

In some examples, the probabilistic sample for calibration market B may be geographically disproportionate relative to the convenience sample for calibration market B and/or relative to the universe of calibration market B. For example, different geographic regions in calibration market B may contribute differently to the probabilistic sample and/or convenience sample based on different panel sampling rates used in the respective geographic regions. For example, a first geographic region in calibration market B may contain 50% of the probabilistic sample in calibration market B, whereas two other geographic regions contain 20% and 30%, respectively, of the probabilistic sample. The convenience sample in calibration market B may contribute 40%, 30% and 30% from the respective regions. Thus, in such an example, the probabilistic sample from calibration market B is distributed geographically differently than the convenience sample in the first and second geographic regions.

In some examples, to account for a geographically disproportionate probabilistic and convenience samples from calibration market B, the calibration market panel data weighter 315 applies geographic weighting to the probabilistic sample from market B. For example, the calibration market panel data weighter 315 can determine geographic weighting targets to apply to the probabilistic sample from calibration market B by determining a geography UE distribution for the probabilistic sample from market B, and then applying that geography UE distribution for market B to the aggregate universe (e.g., sample size) of the convenience sample from the target market A. In some examples, the market panel data weighter 315 determines the geography UE distribution for the probabilistic sample from market B in a manner similar to how the behavioral UE distribution are determined, but with the distribution categories corresponding to different geographic locations/regions instead of different behavior categories.

In the following description, the resulting weighted probabilistic sample determined by the calibration market panel data weighter 315 for calibration market B is referred to as the calibration market probabilistic sample B1.

In the illustrated example, the calibration market panel data weighter 315 similarly weights the convenience sample (or, in other words, the convenience panel data) for calibration market B to correspond to the demographic weighting controls obtained by the behavioral distribution initializer 305 for target market A. For example, convenience sample for calibration market B may include demographic associated with the impression data included in the panelist entries represented in the convenience sample. In some such examples, the calibration market panel data weighter 315 may scale, replicate, remove, etc., ones of the panelist entries included in the convenience sample for calibration market B such that the resulting contribution of impressions for different demographic categories correspond to the demographic weighting controls obtained by the behavioral distribution initializer 305 for target market A. By way of example, the calibration market panel data weighter 315 may weight (e.g., scale, replicate and/or remove) panelist entries in the convenience sample for calibration market B that correspond to a first demographic category to match the weighting control obtained by the behavioral distribution initializer 305 for that demographic category in market A. Similarly, the calibration market panel data weighter 315 may weight (e.g., scale, replicate and/or remove) panelist entries in the convenience sample for calibration market B that correspond to a second demographic category to match the weighting control obtained by the behavioral distribution initializer 305 for that demographic category in market A, and so on for different demographic categories obtained by the behavioral distribution initializer 305 for market A.

In some examples, the convenience sample for calibration market B may be geographically disproportionate relative to the probabilistic sample for calibration market B and/or relative to the universe of calibration market B. For example, different geographic regions in calibration market B may contribute differently to the convenience sample and probability sample based on different panel sampling rates used in the respective geographic regions. In some examples, to account for geographically disproportionate convenience and probability samples from calibration market B, the calibration market panel data weighter 315 applies geographic weighting to the convenience sample from market B. For example, the calibration market panel data weighter 315 can use the geographic weighting targets determined, as described above, for weighting the probabilistic sample from market B to also weight the convenience sample from market B.

In the following description, the resulting weighted convenience sample determined by the calibration market panel data weighter 315 for calibration market B is referred to as the calibration market convenience sample B2.

Next, the behavioral distribution calculator 320 uses the behavioral control variables determined by the behavioral distribution initializer 305 to initialize the behavioral categories for the behavioral distributions to be determined for the target market convenience sample A2, the calibration market probabilistic sample B1 and the calibration market convenience sample B2. In some examples, the behavioral distribution calculator 320 omits behavioral categories not included in the calibration market probabilistic sample B1. For each behavioral category, the behavioral distribution calculator 320 computes the respective percentage of the weighted calibration market probabilistic sample B1 in each defined behavioral category to determine the behavioral distribution for the calibration market probabilistic sample B1. In the following description, the behavioral distribution percentage value of the $c^{th}$ behavioral category in the behavioral distribution for the calibration market probabilistic sample B1 is denoted by B1$c$%.

Likewise, for each behavioral category, the behavioral distribution calculator 320 computes the respective percentage of the weighted calibration market convenience sample B2 in each defined behavioral category to determine the behavioral distribution for the calibration market convenience sample B2. In the following description, the behavioral distribution percentage value of the $c^{th}$ behavioral category in the behavioral distribution for the calibration market convenience sample B2 is denoted by B2$c$%. Likewise, for each behavioral category, the behavioral distribution calculator 320 computes the respective percentage of the weighted target market convenience sample A2 in each defined behavioral category to determine the behavioral distribution for the target market convenience sample A2. In the following description, the behavioral distribution percentage value of the $c^{th}$ behavioral category in the behavioral distribution for the target market convenience sample A2 is denoted by A2$c$%.

Returning to FIG. 2, the behavioral distribution estimator 215 outputs the behavioral distribution for the target market convenience sample A2 (e.g., the values of A2$c$% for the different behavioral categories c), the behavioral distribution for the calibration market probabilistic sample B1 (e.g., the values of B1$c$% for the different behavioral categories c), and the behavioral distribution for the calibration market convenience sample B2 (e.g., the values of B2$c$% for the different behavioral categories c) to the behavioral distribution calibrator 225. In the illustrated example, the behavioral distribution calibrator 225 calibrates the behavioral distribution for the target market convenience sample A2 (e.g., the values of A2$c$% for the different behavioral categories c) based on the behavioral distribution for the calibration market probabilistic sample B1 (e.g., the values of B1$c$% for the different behavioral categories $c$) and the behavioral distribution for the calibration market convenience sample B2 (e.g., the values of B2$c$% for the different behavioral categories $c$). An example implementation of the behavioral distribution calibrator 225 is illustrated in FIG. 4.

Figure 4:
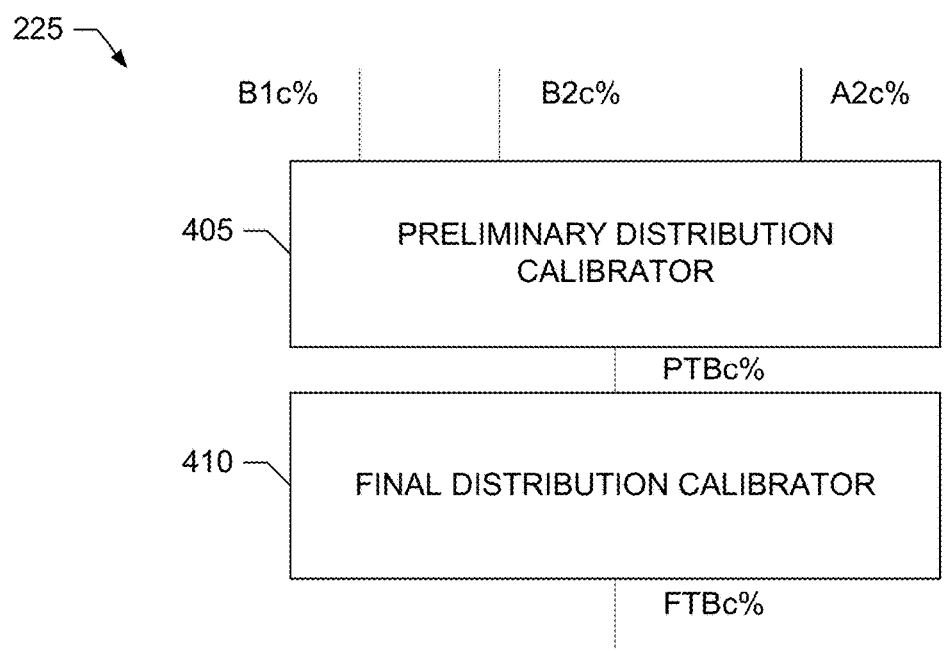
FIG. 4 is a block diagram of an example behavioral distribution calibrator included in the example audience measurement system of FIG. 2.
Figures 7C, 7D:
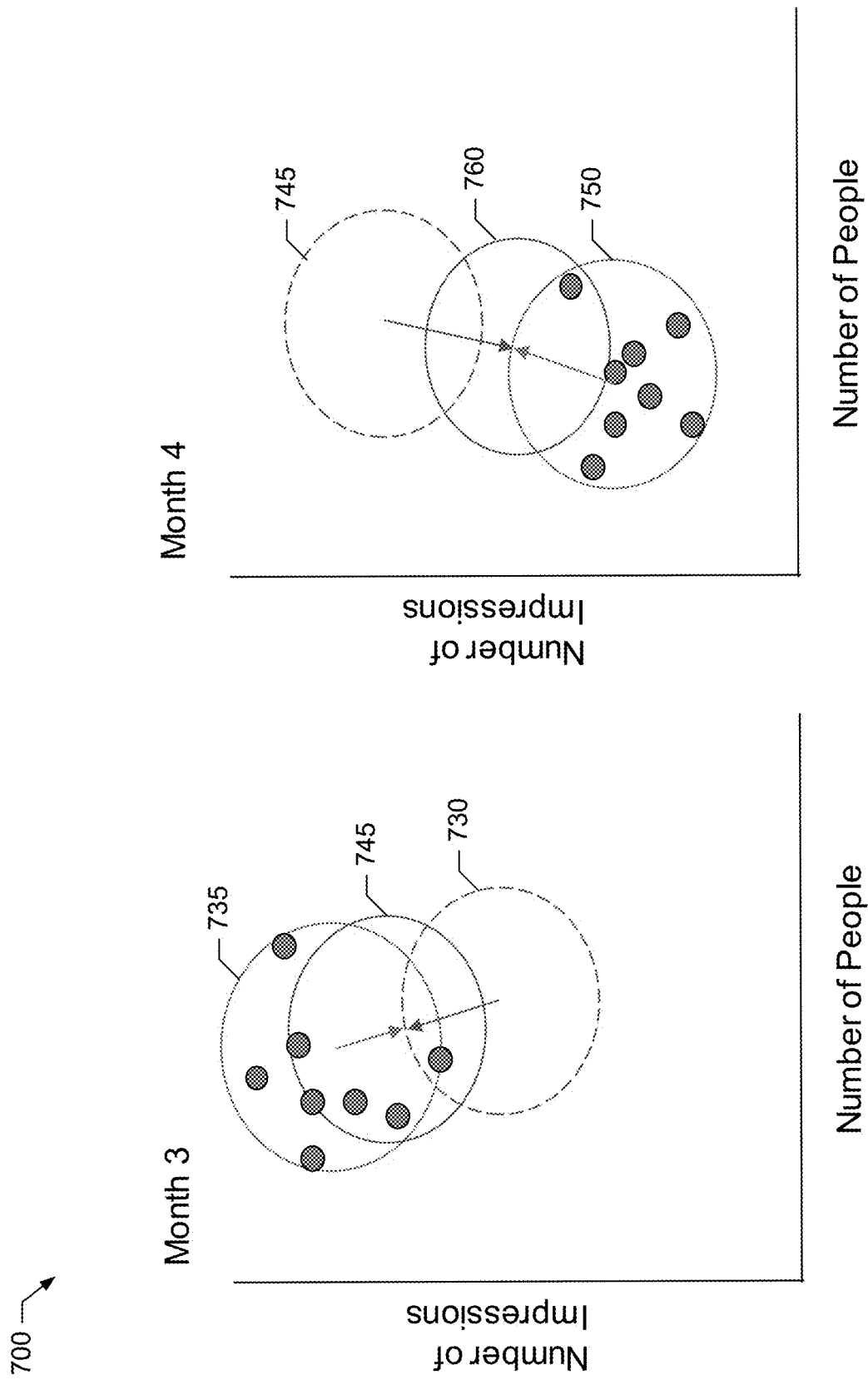
Figures 8A, 8B:
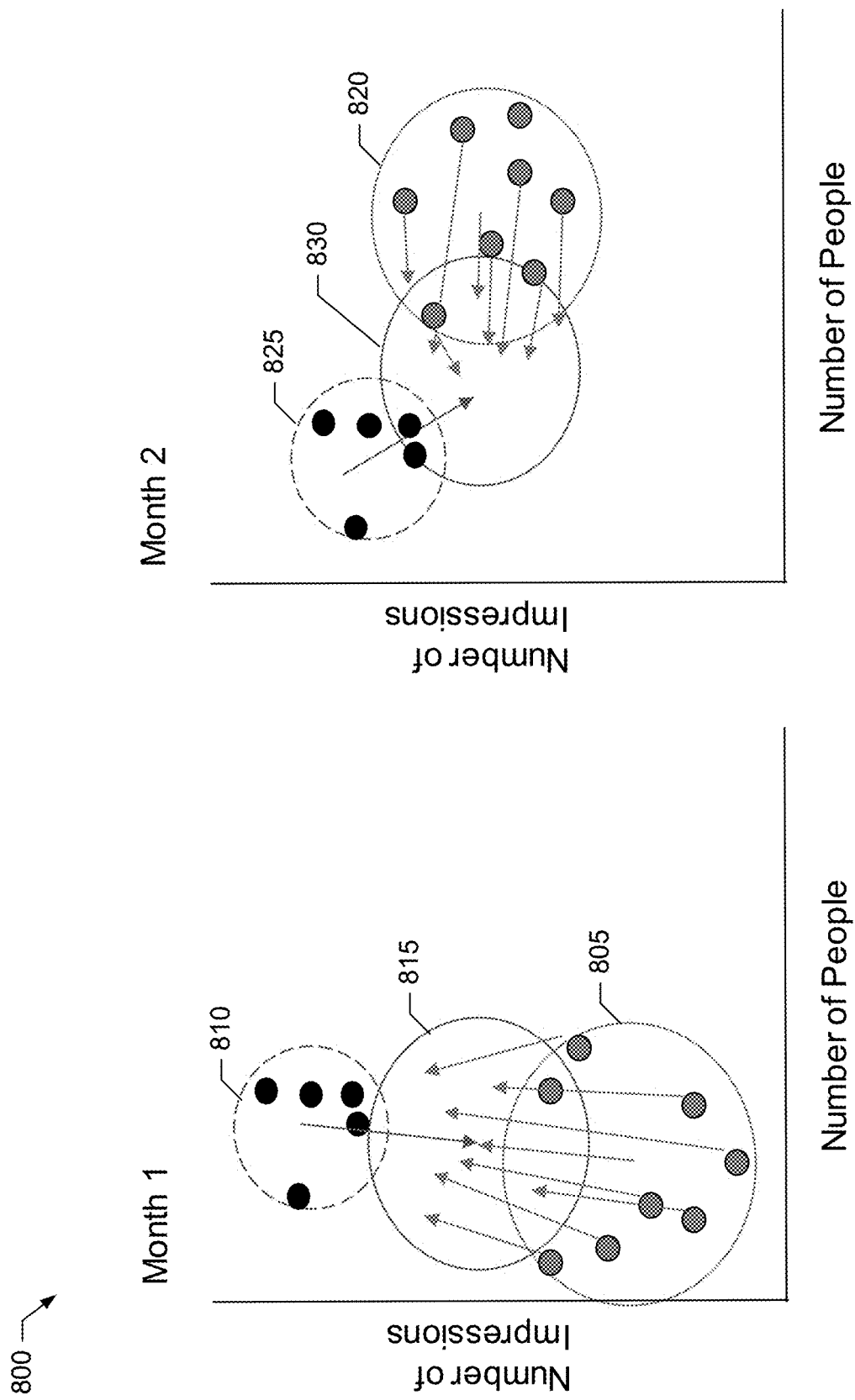

Turning to FIG. 4, the behavioral distribution calibrator 225 of the illustrated example includes an example preliminary distribution calibrator 405 and an example final distribution calibrator 410. The preliminary distribution calibrator 405 performs an initial calibration of the behavioral distribution for the target market convenience sample A2 based on the behavioral distribution for the calibration market probabilistic sample B1 and the behavioral distribution for the calibration market convenience sample. For example, for each behavioral category $c$, the preliminary distribution calibrator 405 computes a preliminary calibrated value for the value A2$c$% of the behavioral distribution for the target market convenience sample A2 using the value B1$c$% of the behavioral distribution for the calibration market probabilistic sample B1 and the value B2$c$% of the behavioral distribution for the calibration market convenience sample B2 according to Equation 1, which is:

$$PTBc = (B1c\% / B2c\%) \times A2c\% \qquad \text{Equation 1}$$

Thus, according to Equation 1, for each behavioral category $c$, the preliminary distribution calibrator 405 scales the value $A2c\%$ of the behavioral distribution for the target market convenience sample A2 by a ratio of (i) the value $B1c\%$ of the behavioral distribution for the calibration market probabilistic sample B1 to (ii) the value $B2c\%$ of the behavioral distribution for the calibration market convenience sample B2 to determine a preliminary calibrated value for the behavioral distribution for the target market convenience sample A2. This preliminary calibrated value is denoted PTBc in Equation 1.

In some examples, if the value $B1c\%$ for the $c^{th}$ category of the behavioral distribution for the calibration market probabilistic sample B1 does satisfy a threshold (e.g., is less than the threshold), then a ratio of (i) the value of a broader (or upper-level, or higher-level) hierarchical behavior category in the behavioral distribution for the calibration market probabilistic sample B1 to (ii) the value of the broader hierarchical behavior category in the behavioral distribution for the calibration market convenience sample B2 is used to scale the value $A2c\%$ of the behavioral distribution for the target market convenience sample A2. For example, the threshold may be configurable based on user input, specified as a configuration parameter, hard-coded, etc. In some examples, the behavioral categories of a behavioral distribution may be arranged in a hierarchical fashion. For example, a first, higher level of a behavioral category hierarchy may segment the panel according to types of online media access, with the first level categories being, for example, news, entertainment, public service and commercials. A second, lower level of the behavioral category hierarchy may segment the behavioral category of news media access into political news, sports news and weather news. If the preliminary distribution calibrator 405 is attempting to calibrate one of the lower level categories (e.g., political news, sports news or weather news) of the behavioral distribution for the target market convenience sample A2, and that category in the behavioral distribution for the calibration market probabilistic sample B1 does not satisfy the threshold, the preliminary distribution calibrator 405 uses the higher level category corresponding to the lower level category (e.g., news in this example) in the behavioral distribution for the calibration market probabilistic sample B1 and in the behavioral distribution for the calibration market target sample B2 to calibrate that lower level behavioral category in the behavioral distribution for the target market convenience sample A2.

For example, assume the value $A2c\%$ of the behavioral distribution for the target market convenience sample A2 corresponds to the "political news" behavioral category in the preceding example, and the corresponding value $B1c\%$ of the "political news" behavioral category in the behavioral distribution for the calibration market probabilistic sample B1 does not satisfy the threshold. Also assume that the respective values of the higher-level category "news" in the behavioral distribution for the calibration market probabilistic sample B1 and in the behavioral distribution for the calibration market target sample B2 are $B1c'\%$ and $B2c'\%$, respectively. Then, the preliminary distribution calibrator 405 computes a preliminary calibrated value for the value $A2c\%$ of the behavioral distribution for the target market convenience sample A2 using the value $B1c'\%$ of the behavioral distribution for the calibration market probabilistic sample B1 and the value $B2c'\%$ of the behavioral distribution for the calibration market convenience sample B2 according to Equation 2, which is:

$$PTBc = (B1c'\% / B2c'\%) \times A2c\% \qquad \text{Equation 2}$$

The final distribution calibrator 410 performs a final calibration of the behavioral distribution for the target market convenience sample A2 to normalize the values of the behavioral distribution to sum to 100% (or a probabilistic value of 1). In some examples, the preliminary calibrated values, PTBc, determined by the preliminary distribution calibrator 405 for the behavioral distribution for the target market convenience sample A2 do not sum to 100% (or a probabilistic value of 1). Thus, for each behavioral category $c$, the final distribution calibrator 410 computes a final calibrated value, denoted FTBc, for the preliminary calibrated value, denoted PTBc, of the behavioral distribution for the target market convenience sample A2 according to Equation 3, which is:

$$FTBc = (100 / \Sigma c PTBc) \times PTBc. \qquad \text{Equation 3.}$$

In Equation 3, the summation is over the behavioral categories defined for the behavioral distribution for the target market convenience sample A2.

In some examples, the final distribution calibrator 410 outputs the values of FTBc as the calibrated behavioral distribution for the target market convenience sample A2. For example, such values of FTBc output by the final distribution calibrator 410 can correspond to calibrated versions of the values in the "Weighted Distribution" column of Table 1 above.

In some examples, the behavioral distribution estimator 215 and the behavioral distribution calibrator 225 of the audience measurement system 200 repeat the foregoing operations for additional calibration markets (e.g., such as calibration markets C, D, E, etc.). In such examples, the behavioral distribution estimator 215 and the behavioral distribution calibrator 225 determine different calibrated behavioral distributions for the target market convenience sample A2, which each one being calibrated based on a different one of the calibration markets. However, in some such examples, the behavioral categories initialized for some, or all, of the behavioral distributions determined by the behavioral distribution estimator 215 are limited to the behavioral categories included in the included in the calibration sample for the first calibration market, such as market B in the preceding examples.

In some examples, if additional calibration markets are utilized, the behavioral distribution calibrator 225 computes the final calibrated behavioral distribution for the target market convenience sample A2 as the average the calibrated behavioral distributions determined based on the different calibration markets. In some examples, the behavioral distribution calibrator 225 computes the final calibrated behavioral distribution for the target market convenience sample A2 as a weighted average of the calibrated behavioral distributions determined based on the different calibration markets, with some calibrated behavioral distributions weighted more than others in the average based on one or more criteria.

Returning to FIG. 2, the target convenience panel data calibrator 230 of the audience measurement reports the calibrated behavioral UE distribution determined by the behavioral distribution calibrator 225 for the convenience sample target market A and the given measurement period to downstream audience measurement processing. In some examples, the target convenience panel data calibrator 230 may also use the calibrated behavioral UE distribution determined for the target market A and the given measurement period to calibrate (e.g., weight) the convenience panel data (e.g., convenience sample) obtained by the convenience panel interface 110 for the target market A during the given measurement period to reduce behavioral bias present in the convenience panel data obtained for the target market. For example, the target convenience panel data calibrator 230 may weight the convenience panel data (e.g., convenience sample) obtained by the convenience panel interface 110 for the target market A during the given measurement period by the geodemographic controls described above to meet demographic and geographic-based targets, as well as by the calibrated behavioral targets represented by the calibrated behavioral UE distribution. The result is calibrated convenience panel data (e.g., the calibrated convenience sample) for target market A during the given measurement period. Additionally or alternatively, the target convenience panel data calibrator 230 may weight any other data sample, which is intended to represent the population universe of the target market A and the given measurement period, by the geodemographic controls for the target market A and the calibrated behavioral targets represented by the calibrated behavioral UE distribution to determine a corresponding, calibrated data sample for the target market A. In some examples, the downstream audience measurement processing may use the calibrated convenience panel data, any other calibrated data sample(s) determined for the target market, and/or the calibrated behavioral UE distribution reported by the target convenience panel data calibrator 230 for the target market and given measurement period to determine audience estimate(s) (e.g., ratings, reach, impressions, etc.) for online media in the target market. For example, such an output audience estimate can correspond to calibrated versions of the values in the "Weighted Estimate" column of Table 1 above.

In the illustrated example of FIG. 2, the probabilistic panel interface 105, the convenience panel interface 110, the behavioral distribution estimator 215, the behavioral distribution calibrator 225 and the example target convenience panel data calibrator 230 repeat the procedure described above for each subsequent measurement interval to determine a new, calibrated behavioral UE distribution for the convenience sample of the target market for each subsequent measurement interval. In some examples, the target convenience panel data calibrator 230 also determines a calibrated convenience sample (and/or other calibrated data samples(s)) for the target market and for each subsequent measurement interval using the calibrated behavioral UE distribution determined for that subsequent measurement interval.

FIGS. 5A-5D illustrate a first example technique 500 for calibrating convenience panel behavioral UE distributions for a first market based on behavioral UE distributions determined for probabilistic panel data associated with the first market and behavioral UE distributions determined for convenience panel data also associated with the first market. The first example technique 500, which is different from the examples described above in connection with FIGS. 1-4, begins in a first measurement period (e.g., Month 1) with an example convenience panel behavioral UE distribution 505 for the first market (e.g., the target market) and the first measurement period being weighted to align with an example probabilistic panel behavioral UE distribution 510 for the same first market and the first measurement period to determine an example calibrated convenience panel behavioral UE distribution 515 for the first market and the first measurement period. Then, during a second measurement period (e.g., Month 2), an example convenience panel behavioral UE distribution 520 for the first market and the second measurement period is weighted to align with an example probabilistic panel behavioral UE distribution 525 for the same first market and the second measurement period to determine an example calibrated convenience panel behavioral UE distribution 530 for the first market and the second measurement period. Then, during a third measurement period (e.g., Month 3), an example convenience panel behavioral UE distribution 535 for the first market and the third measurement period is weighted to align with an example probabilistic panel behavioral UE distribution 540 for the first market and the third measurement period to determine an example calibrated convenience panel behavioral UE distribution 545 for the first market and the third measurement period. Then, during a fourth measurement period (e.g., Month 4), an example convenience panel behavioral UE distribution 550 for the first market and the fourth measurement period is weighted to align with an example probabilistic panel behavioral UE distribution 555 for the first market and the fourth measurement period to determine an example calibrated convenience panel behavioral UE distribution 560 for the first market and the fourth measurement period. Thus, in the illustrated example of FIGS. 5A-5D, for each measurement period, the convenience panel behavioral UE distribution obtained for the first market and for that measurement period is weighted to align with the probabilistic panel behavioral UE distribution obtained for that same first market and measurement period.

FIGS. 6A-6D illustrate a second example technique 600 for determining behavioral UE distributions for a first market based on behavioral UE distributions determined for just convenience panel data associated with the first market. The second example technique 600, which is different from the examples described above in connection with FIGS. 1-4, begins in a first measurement period (e.g., Month 1) with an example convenience panel behavioral UE distribution 605 for the first market (e.g., target market) and the first measurement period being used without probabilistic panel data to determine an example target behavioral UE distribution 610 for the first market and the first measurement period. Then, during a second measurement period (e.g., Month 2), an example convenience panel behavioral UE distribution 615 for the first market and the second measurement period is used without probabilistic panel data to determine an example target behavioral UE distribution 620 for the first market and the second measurement period. Then, during a third measurement period (e.g., Month 3), an example convenience panel behavioral UE distribution 625 for the first market and the third measurement period is used without probabilistic panel data to determine an example target behavioral UE distribution 630 for the first market and the third measurement period. Then, during a fourth measurement period (e.g., Month 4), an example convenience panel behavioral UE distribution 635 for the first market and the fourth measurement period is used without probabilistic panel data to determine an example target behavioral UE distribution 640 for the first market and the fourth measurement period.

FIGS. 7A-7D illustrate a third example technique 700 for calibrating convenience panel behavioral UE distributions for a first market (e.g., the target market) iteratively based on an initial behavioral UE distribution determined from probabilistic panel data associated with a second market (e.g., the calibration market) different from the first market. The third example technique 700, which corresponds to the example described above in connection with FIG. 1, begins in a first measurement period (e.g., Month 1) with an example convenience panel behavioral UE distribution 705 for the first market and the first measurement period being weighted and combined with an example weighted probabilistic panel behavioral UE distribution 710 for the second market and the first measurement period to determine an example calibrated behavioral UE distribution 715 for the first market and the first measurement period. Then, during a second measurement period (e.g., Month 2), an example convenience panel behavioral UE distribution 720 for the first market and the second measurement period is weighted and combined with the weighted, calibrated behavioral UE distribution 715 determined for the first measurement period to determine a new example calibrated behavioral UE distribution 730 for the first market and the second measurement period. Then, during a third measurement period (e.g., Month 3), an example convenience panel behavioral UE distribution 735 for the first market and the third measurement period is weighted and combined with the weighted, calibrated behavioral UE distribution 730 determined for the second measurement period to determine a new example calibrated behavioral UE distribution 745 for the first market and the third measurement period. Then, during a fourth measurement period (e.g., Month 4), an example convenience panel behavioral UE distribution 750 for the first market and the fourth measurement period is weighted and combined with the weighted, calibrated behavioral UE distribution 745 determined for the third measurement period to determine a new example calibrated behavioral UE distribution 460 for the first market and the fourth measurement period. Thus, in the illustrated example of FIGS. 7A-7D, for an initial measurement period, the convenience panel behavioral UE distribution obtained for the first market and for that measurement period is weighted and combined with a weighted, probabilistic panel behavioral UE distribution obtained for a different second market to determine a calibrated behavioral UE distribution for the first market and the initial measurement period. Thereafter, for each subsequent measurement period, the convenience panel behavioral UE distribution obtained for the first market and for a given subsequent measurement period is weighted and combined with the weighted, calibrated behavioral UE distribution determined for the prior measurement period to determine a new calibrated behavioral UE distribution for the first market and the given measurement period.

FIGS. 8A-8D illustrate a fourth example technique 800 for calibrating behavioral UE distributions determined from convenience panel data for a first market (e.g., the target market) based on behavioral UE distributions determined from probabilistic panel data and convenience panel data associated with a second market (e.g., the calibration market), which is different from the first market. The fourth example technique 800, which corresponds to the example described above in connection with FIGS. 2-4, begins in a first measurement period (e.g., Month 1) with an example convenience panel behavioral UE distribution 805 for the first market and the first measurement period being calibrated based on an example combination 810 of probabilistic panel and convenience panel behavioral UE distributions for the second market and the first measurement period to determine an example calibrated convenience panel behavioral UE distribution 815 for the first market and the first measurement period. Then, during a second measurement period (e.g., Month 2), an example convenience panel behavioral UE distribution 820 for the first market and the second measurement period is calibrated based on an example combination 825 of probabilistic panel and convenience panel behavioral UE distributions for the second market and the second measurement period to determine a new example calibrated convenience panel behavioral UE distribution 830 for the first market and the second measurement period. Then, during a third measurement period (e.g., Month 3), an example convenience panel behavioral UE distribution 835 for the first market and the third measurement period is calibrated based on an example combination 840 of probabilistic panel and convenience panel behavioral UE distributions for the second market and the third measurement period to determine a new example calibrated convenience panel behavioral UE distribution 845 for the first market and the third measurement period. Then, during a fourth measurement period (e.g., Month 4), an example convenience panel behavioral UE distribution 850 for the first market and the fourth measurement period is calibrated based on an example combination 855 of probabilistic panel and convenience panel behavioral UE distributions for the second market and the fourth measurement period to determine a new example calibrated convenience panel behavioral UE distribution 860 for the first market and the fourth measurement period. Thus, in the illustrated example of FIGS. 7A-7D, for each measurement period, the convenience panel behavioral UE distribution obtained for the first market (e.g., target market) and for that measurement period is calibrated based on a combination of probabilistic panel and convenience panel behavioral UE distributions obtained for a different second market to determine a calibrated convenience panel behavioral UE distribution for the first market and that measurement period.

Figure 9A:
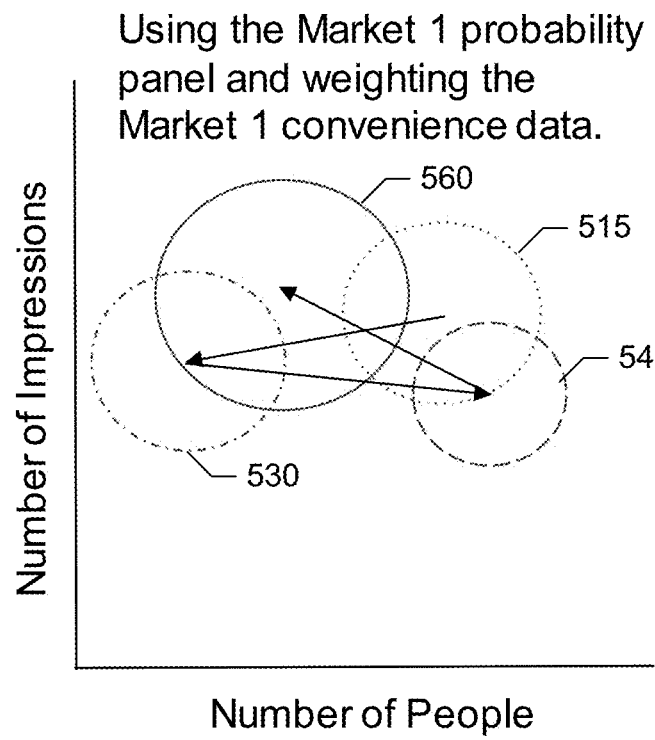
FIGS. 9A-9C depict a comparison of the first example technique illustrated in FIGS. 5A-5D, the second example technique illustrated in FIGS. 6A-6D, and the fourth example technique illustrated in FIGS. 8A-8D.
Figure 9B:
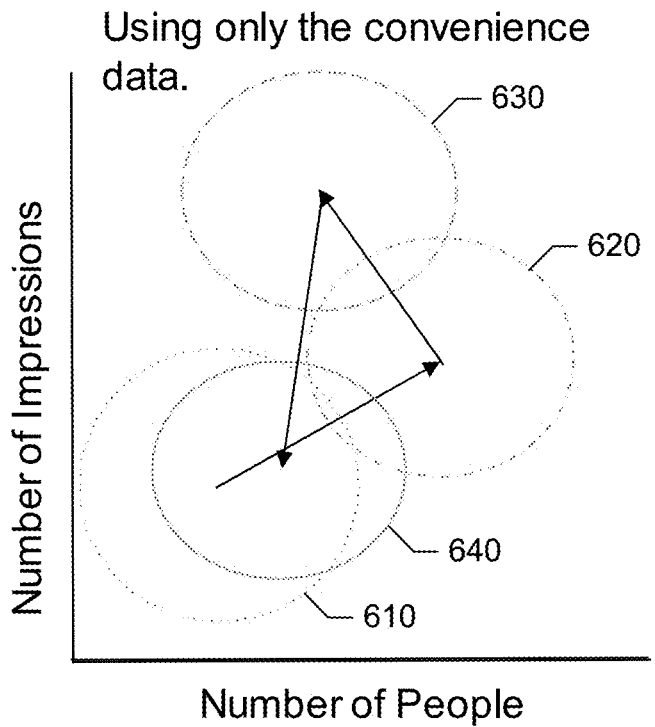
Figure 9C:
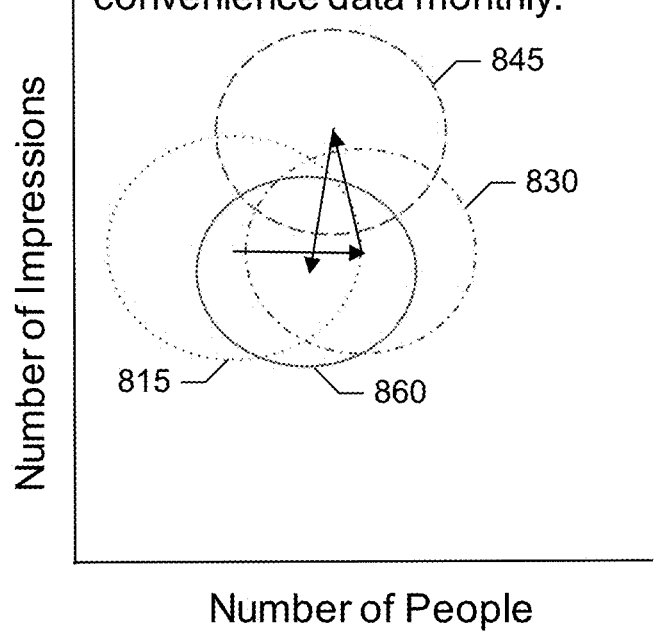

FIGS. 9A-9C depict a comparison of the first example technique 500 illustrated in FIGS. 5A-5D, the second example technique 600 illustrated in FIGS. 6A-6D, and the fourth example technique 800 illustrated in FIGS. 8A-8D. In particular, FIG. 9A depicts the resulting calibrated behavioral UE distributions 515, 530, 545 and 560 determined by the first example technique 500 during the four example measurement periods, as described above in connection with FIGS. 5A-5D. FIG. 9B depicts the resulting behavioral UE distributions 610, 620, 630 and 640 determined by the second example technique 600 during the four example measurement periods, as described above in connection with FIGS. 6A-6D. FIG. 9C depicts the resulting calibrated behavioral UE distributions 815, 830, 845 and 860 determined by the fourth example technique 800 during the four example measurement periods, as described above in connection with FIGS. 8A-8D. As can be seen from FIGS. 9A-9C, the fourth example technique 800, which can be implemented by the example audience measurement system 200 of FIGS. 2-4, yields calibrated behavioral UE distributions with less volatility than the behavioral UE distributions obtained from the other example techniques 500 and 600.

While example manners of implementing the audience measurement system 100 and the audience measurement system 100 are illustrated in FIGS. 1-4, one or more of the elements, processes and/or devices illustrated in FIGS. 1-4 may be combined, divided, re-arranged, omitted, eliminated and/or implemented in any other way. Further, the example probabilistic panel interface 105, the example convenience panel interface 110, the example behavioral distribution estimator 115, the example calibration distribution selector 120, the example behavioral distribution calibrator 125, the example convenience panel data calibrator 130, the example behavioral distribution estimator 215, the example behavioral distribution calibrator 225, the example target convenience panel data calibrator 230, the example behavioral distribution initializer 305, the example target market panel data weighter 310, the example calibration market panel data weighter 315, the example behavioral distribution calculator 320, the example preliminary distribution calibrator 405, the example final distribution calibrator 410 and, more generally, the example audience measurement system 100 and/or the audience measurement system 200 of FIGS. 1-4 may be implemented by hardware, software, firmware and/or any combination of hardware, software and/or firmware. Thus, for example, any of the example probabilistic panel interface 105, the example convenience panel interface 110, the example behavioral distribution estimator 115, the example calibration distribution selector 120, the example behavioral distribution calibrator 125, the example convenience panel data calibrator 130, the example behavioral distribution estimator 215, the example behavioral distribution calibrator 225, the example target convenience panel data calibrator 230, the example behavioral distribution initializer 305, the example target market panel data weighter 310, the example calibration market panel data weighter 315, the example behavioral distribution calculator 320, the example preliminary distribution calibrator 405, the example final distribution calibrator 410 and, more generally, the example audience measurement system 100 and/or the example audience measurement system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example audience measurement system 100, the example audience measurement system 200, the example probabilistic panel interface 105, the example convenience panel interface 110, the example behavioral distribution estimator 115, the example calibration distribution selector 120, the example behavioral distribution calibrator 125, the example convenience panel data calibrator 130, the example behavioral distribution estimator 215, the example behavioral distribution calibrator 225, the example target convenience panel data calibrator 230, the example behavioral distribution initializer 305, the example target market panel data weighter 310, the example calibration market panel data weighter 315, the example behavioral distribution calculator 320, the example preliminary distribution calibrator 405 and/or the example final distribution calibrator 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement system 100 and/or the example audience measurement system 200 may include one or more elements, processes and/or devices in addition to, or instead of, those illustrated in FIGS. 1-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
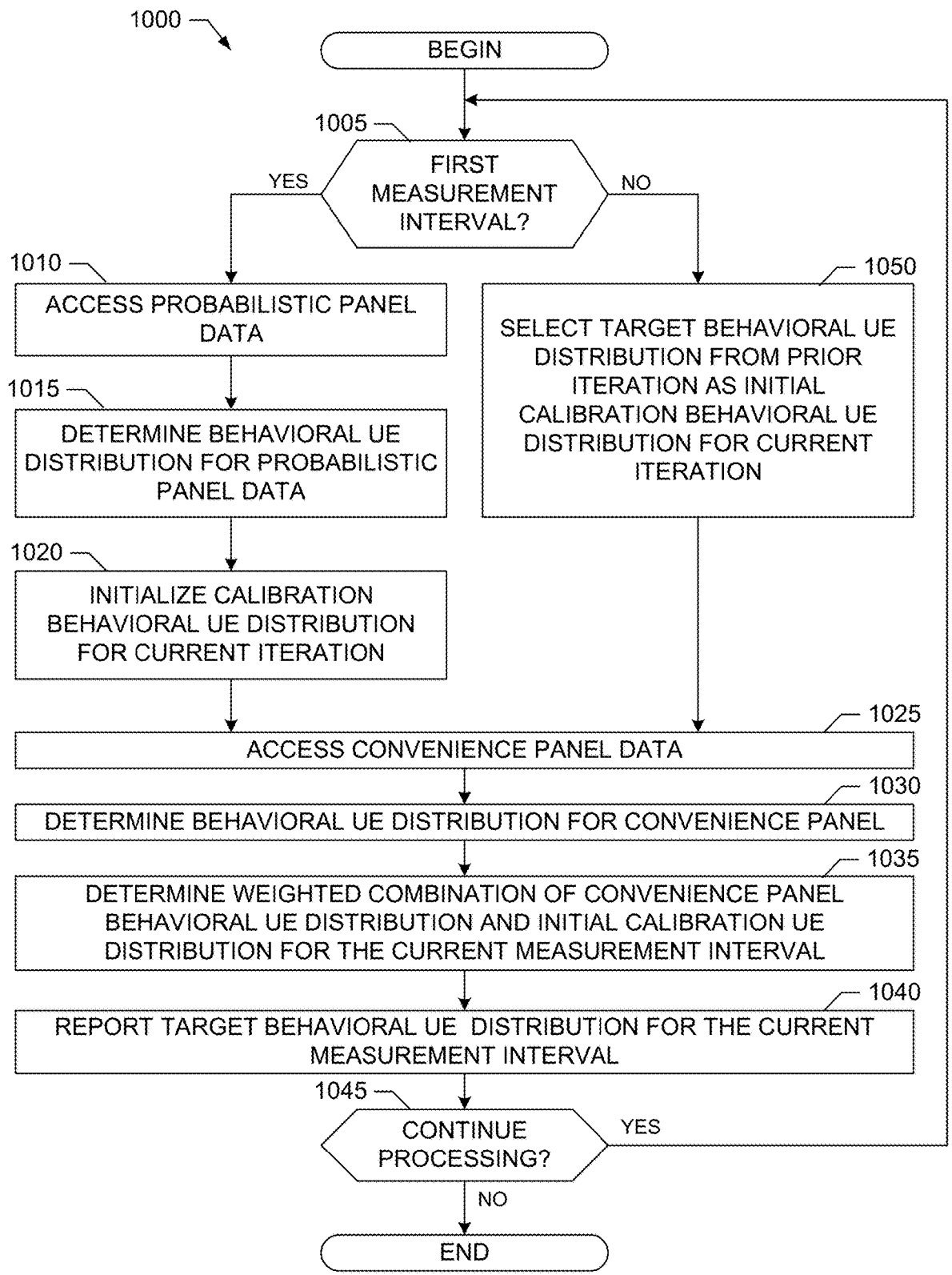
FIG. 10 is a flowchart representative of example machine readable instructions that may be executed to implement the example audience measurement system of FIG. 1.
Figure 11:
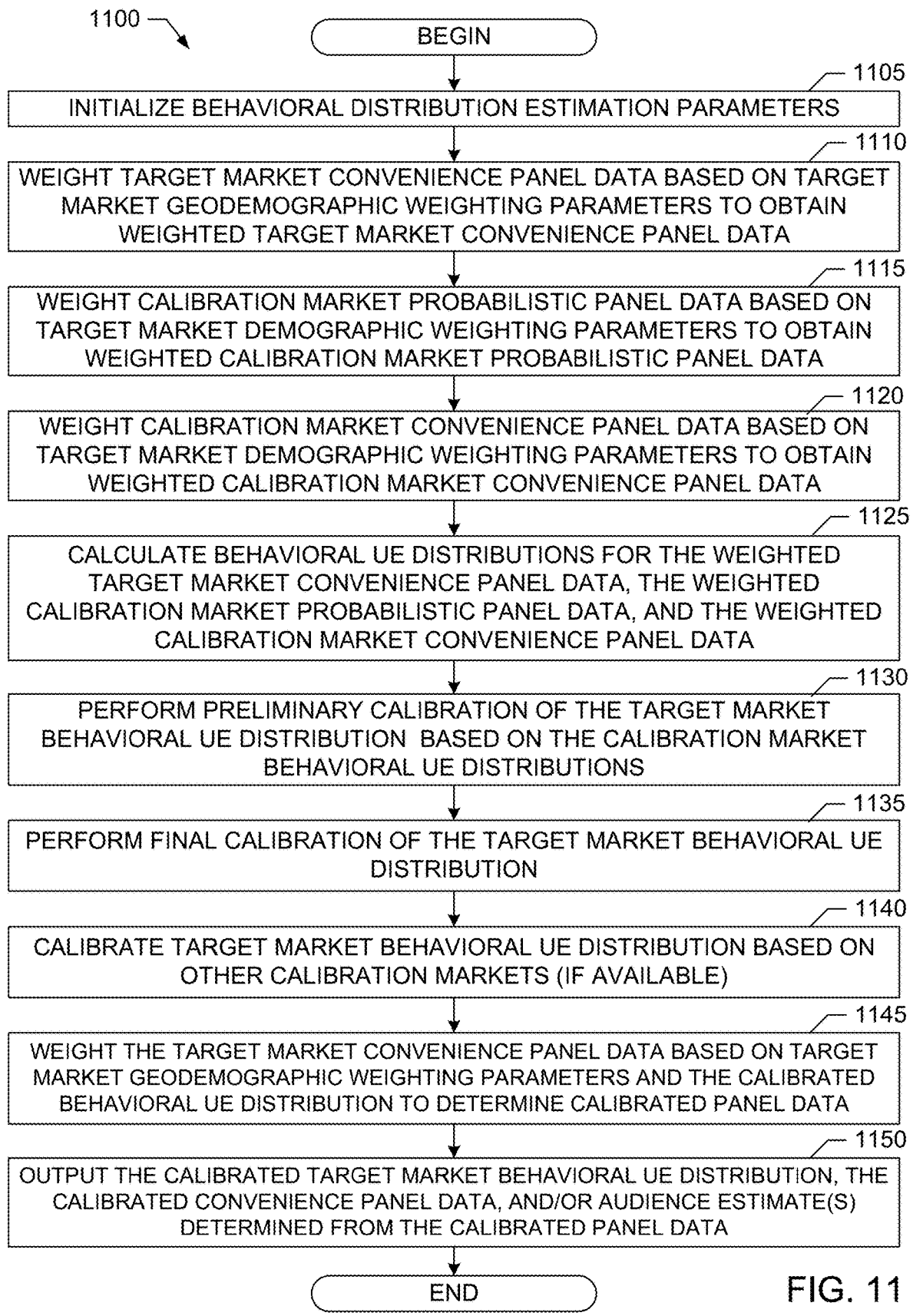
FIG. 11 is a flowchart representative of example machine readable instructions that may be executed to implement the example audience measurement system of FIG. 2.

Flowcharts representative of example hardware logic, machine readable instructions, hardware implemented state machines, and/or any combination thereof for implementing the audience measurement system 100 and the audience measurement system 200 are shown in FIGS. 10-11. In this example, the machine readable instructions may be one or more executable programs or portion(s) thereof for execution by a computer processor, such as the processor 1212 shown in the example processor platform 1200 discussed below in connection with FIG. 12. The one or more programs, or portion(s) thereof, may be embodied in software stored on a non-transitory computer readable storage medium such as a CD-ROM, a floppy disk, a hard drive, a DVD, a Blu-ray disk™, or a memory associated with the processor 1212, but the entire program or programs and/or parts thereof could alternatively be executed by a device other than the processor 1212 and/or embodied in firmware or dedicated hardware. Further, although the example program(s) is(are) described with reference to the flowcharts illustrated in FIGS. 10-11, many other methods of implementing the example audience measurement system 100 and/or the example audience measurement system 200 may alternatively be used. For example, with reference to the flowcharts illustrated in FIGS. 10-11, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 10-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 1000 that may be executed to implement the example audience measurement system 100 of FIG. 1 is illustrated in FIG. 10. With reference to the preceding figures and associated written descriptions, the example program 1000 of FIG. 10 begins execution at block 1005 at which, if the measurement interval is the first measurement interval for which calibration is to be performed, execution proceeds to block 1010. At block 1010, the example probabilistic panel interface 105 accesses probabilistic panel data for a calibration market and for the first measurement interval, as described above. At block 1015, the example behavioral distribution estimator 115 determines a behavioral UE distribution for the probabilistic panel data obtained for the calibration market and for the first measurement interval, as described above. At block 1020, the example calibration distribution selector 120 selects the probabilistic panel behavioral UE distribution determined at block 1015 to be the initial calibration behavioral distribution, as described above. At block 1025, the example convenience panel interface 110 accesses convenience panel data for a target market and for the first measurement interval, as described above. At block 1030, the behavioral distribution estimator 115 determines a behavioral UE distribution for the convenience panel data obtained for the target market and for the first measurement interval, as described above. At block 1035, the example behavioral distribution calibrator 125 weights and combines the behavioral UE distribution for the convenience panel data determined at block 1030 with the initial calibration behavioral distribution determined at block 1020 to determine a target behavioral UE distribution for the target market and first measurement interval, as described. At block 1040, the example target convenience panel data calibrator 130 reports the calibrated convenience panel UE distribution for the target market and first measurement interval, as described above.

If processing is to continue for a subsequent measurement interval, execution returns to block 1005. Execution further continues to block 1050 because the subsequent measurement interval is not the first measurement interval. At block 1050, the example calibration distribution selector 120 selects the target behavioral UE distribution determined at block 1040 for the target market and prior measurement interval to be the initial calibration behavioral distribution for the current measurement interval, as described above. Processing then continues through blocks 1025-1040, as described above, which yields a target behavioral UE distribution for the target market and the subsequent measurement interval, as described above. Execution then continues iterating from block 1045 to block 1050 followed by blocks 1025-1040 to yield target behavioral UE distributions for the target market and subsequent measurement intervals.

An example program 1100 that may be executed to implement the example audience measurement system 200 of FIGS. 2-4 is illustrated in FIG. 11. With reference to the preceding figures and associated written descriptions, the example program 1100 of FIG. 11 begins execution at block 1105 at which the example behavioral distribution initializer 305 of the example behavioral distribution estimator 215 included in the audience measurement system 200 initializes the behavioral distribution parameters used by the behavioral distribute on estimator 215, as described above. At block 1110, the example target market panel data weighter 310 of the behavioral distribution estimator 215 weights, as described above, convenience panel data from a target market based on geodemographic weighting parameters for the target market to determine weighted target market convenience panel data (e.g., the target market convenience sample A2 described above). At block 1115, the example calibration market panel data weighter 315 of the behavioral distribution estimator 215 weights, as described above, probabilistic panel data from a calibration market based on demographic weighting parameters for the target market to determine weighted calibration market probabilistic panel data (e.g., the calibration market probabilistic sample B1 described above). At block 1120, the calibration market panel data weighter 315 weights, as described above, convenience panel data from the calibration market based on the demographic weighting parameters for the target market to determine weighted calibration market convenience panel data (e.g., the calibration market convenience sample B2 described above).

At block 1125, the example behavioral distribution calculator 320 of the behavioral distribution estimator 215 calculates, as described above, a behavioral UE distribution for the weighted target market convenience panel data (e.g., with the category values A2$c$% described above). At block 1125, the behavioral distribution calculator 320 calculates, as described above, a behavioral UE distribution for the weighted calibration market probabilistic panel data (e.g., with the category values B1$c$% described above). At block 1125, the behavioral distribution calculator 320 further calculates, as described above, a behavioral UE distribution for the weighted calibration market convenience panel data (e.g., with the category values B2$c$% described above).

At block 1130, the example preliminary distribution calibrator 405 of the example behavioral distribution calibrator 225 included in the audience measurement system 200 performs, as described above, preliminary calibration of the behavioral UE distribution determined for the weighted target market convenience panel data (e.g., with the category values A2$c$%) based on the behavioral UE distributions determined for the weighted calibration market probabilistic panel data (e.g., with the category values B1$c$% described above) and the weighted calibration market convenience panel data (e.g., with the category values B2$c$% described above). At block 1135, the example final distribution calibrator 410 of the behavioral distribution calibrator 225 performs, as described above, a final calibration of the preliminary calibrated values (e.g., corresponding to PTBc described above) of the convenience panel behavioral UE distribution for the target market to yield the final calibrated values (e.g., corresponding to FTBc described above) of the convenience panel behavioral UE distribution for the target market.

At block 1140, the behavioral distribution estimator 215 and the behavioral distribution calibrator 225 repeat the processing at blocks 1105-1135 to calibrate the convenience panel behavioral UE distribution for the target market based on probabilistic and convenience panel behavioral UE distributions for other calibration markets, as described above. At block 1140, the behavioral distribution calibrator 225 combines (e.g., averages) the calibration results based on the different calibration markets to determine a final, calibrated convenience panel behavioral UE distribution for the target market and the current measurement interval.

At block 1145, the example target convenience panel data calibrator 230 of the audience measurement system 200 weights, as described above, the convenience panel data (e.g., convenience sample) for the target market and current measurement interval by the geodemographic weighting parameters for the target market and the calibrated behavioral targets represented by the calibrated behavioral UE distribution to determine calibrated convenience panel data (e.g., a calibrated convenience sample) for the target market and current measurement interval. Additionally or alternatively, at block 1145, the target convenience panel data calibrator 230 weights any other data sample(s) intended to represent the target market and the current measurement interval by the geodemographic weighting parameters for the target market and the calibrated behavioral targets represented by the calibrated behavioral UE distribution to determine corresponding, calibrated data sample(s) for the target market.

At block 1150, the example target convenience panel data calibrator 230 of the audience measurement system 200 outputs the final, calibrated convenience panel behavioral UE distribution for the target market and the current measurement interval for use in downstream audience measurement processing. Additionally or alternatively, at block 1150, the target convenience panel data calibrator 230 outputs the calibrated convenience panel data and/or other calibrated data sample(s) for the target market for use in downstream audience measurement processing. Additionally or alternatively, at block 1150, the target convenience panel data calibrator 230 determines and outputs online media audience estimate(s) (e.g., ratings, reach, impressions, etc.) based on the calibrated convenience panel data and/or other calibrated data sample(s) determined for the target market and current measurement interval.

Figure 12:
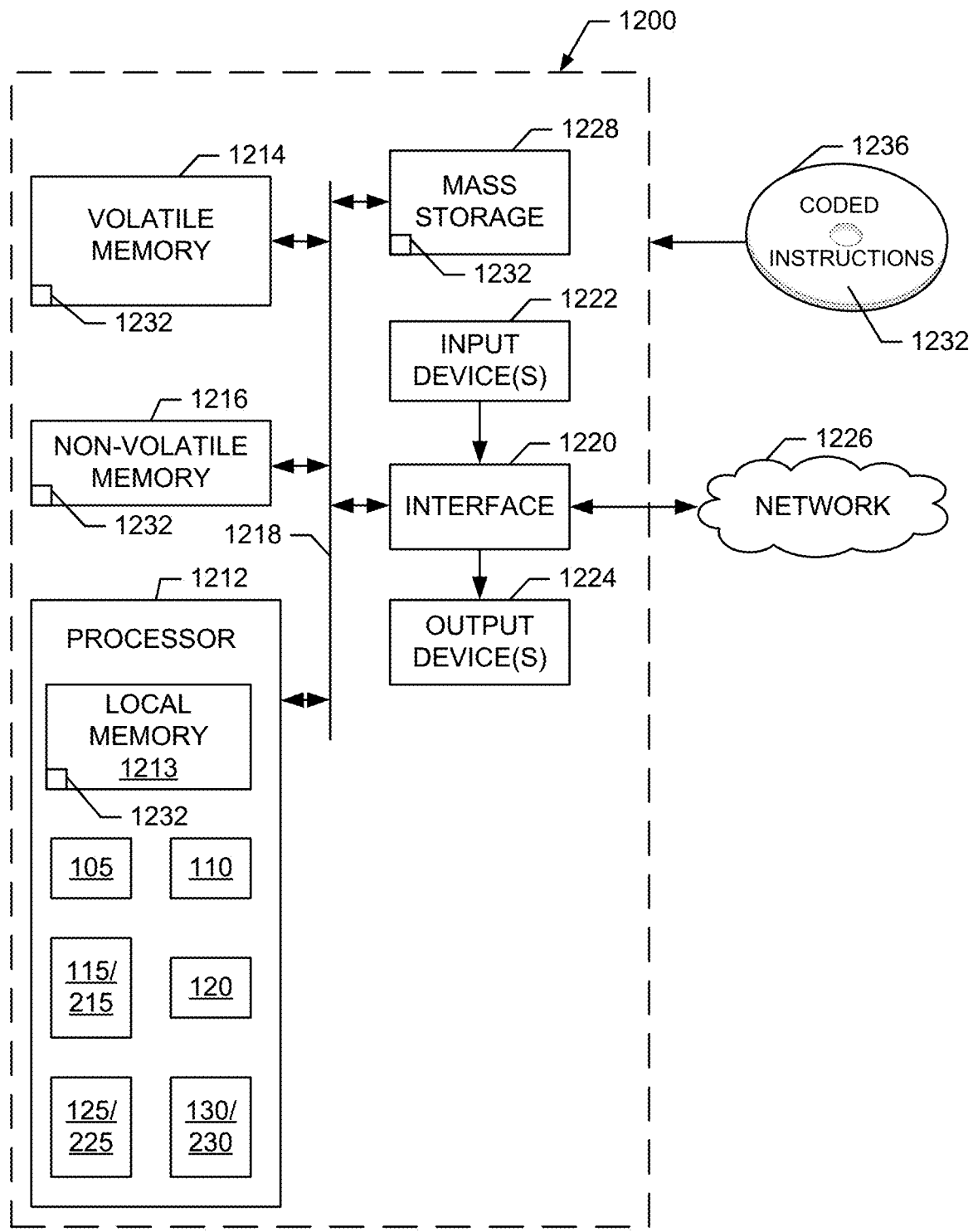
FIG. 12 is a block diagram of an example processor platform structured to execute the example machine readable instructions of FIGS. 10 and/or 11 to implement the example audience measurement systems of FIGS. 1 and/or 2.

FIG. 12 is a block diagram of an example processor platform 1200 structured to execute the instructions of FIGS. 10 and/or 11 to implement the example audience measurement system 100 and/or the example audience measurement system 200 of FIGS. 1-4. The processor platform 1200 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor 1212 may be a semiconductor based (e.g., silicon based) device. In the illustrated example, when implementing the example audience measurement system 100, the processor 1212 implements the example probabilistic panel interface 105, the example convenience panel interface 110, the example behavioral distribution estimator 115, the example calibration distribution selector 120, the example behavioral distribution calibrator 125, and the example convenience panel data calibrator 130. In the illustrated example, when implementing the example audience measurement system 200, the processor 1212 implements the example probabilistic panel interface 105, the example convenience panel interface 110, the example behavioral distribution estimator 215, the example behavioral distribution calibrator 225 and the example target convenience panel data calibrator 230.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 corresponding to the instructions of FIGS. 10 and/or 11 may be stored in the mass storage device 1228, in the volatile memory 1214, in the non-volatile memory 1216, in the local memory 1213 and/or on a removable non-transitory computer readable storage medium, such as a CD or DVD 1236.

From the foregoing, it will be appreciated that example methods, apparatus and articles of manufacture have been disclosed that perform multi-market calibration of convenience panel data to reduce behavioral biases. The disclosed methods, apparatus and articles of manufacture improve the efficiency of using a computing device by enabling large convenience panel data samples to be used in audience measurement systems without introducing behavioral bias to the system, or at least with a reduction in the behavioral bias associated with the uncalibrated convenience panel data samples. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising:
   a network interface;
   at least one processor; and
   memory having stored therein machine readable instructions that, when executed by the at least one processor, cause the computing system to at least:
   communicate, via the network interface, with a first monitoring system that is to monitor online media served in a first market to obtain first panel data associated with the first market and a first measurement period, demographic characteristics of the first panel data to be unknown or unverified;
   communicate, via the network interface, with a second monitoring system that is to monitor online media served in a second market to obtain second panel data associated with the second market and the first measurement period, demographic characteristics of the second panel data to be unknown or unverified;
   communicate, via the network interface, with a plurality of meters that are to monitor compute devices in the second market to obtain third panel data associated with the second market and the first measurement period, demographic characteristics of the third panel data to be known;
   calibrate the first panel data associated with the first market based on the second panel data associated with the second market and the third panel data associated with the second market to determine calibrated first panel data associated with the first market; and
   output the calibrated first panel data associated with the first market to a downstream measurement process to be performed by an audience measurement system to determine an audience estimate for the online media served in the first market.

2. The computing system of claim 1, wherein the machine readable instructions further cause, when executed by the at least one processor, the computing system to calibrate the first panel data associated with the first market by:
   calibrating a first behavioral distribution determined from the first panel data to determine a calibrated first behavioral distribution, the first behavior distribution to be calibrated based on a second behavioral distribution determined from the second panel data and a third behavioral distribution determined from the third panel data; and
   calibrating the first panel data based on the calibrated first behavioral distribution.

3. The computing system of claim 2, wherein the machine readable instructions further cause, when executed by the at least one processor, the computing system to:
- weight the first panel data associated with the first market to determine weighted first panel data associated with the first market, the first panel data to be weighted based on demographic weighting controls; and
- determine the first behavioral distribution based on the weighted first panel data associated with the first market.

4. The computing system of claim 3, wherein the machine readable instructions further cause, when executed by the at least one processor, the computing system to:
- weight the second panel data associated with the second market to determine weighted second panel data associated with the second market, the second panel data to be weighted based on the demographic weighting controls obtained for the first market;
- determine the second behavioral distribution based on the weighted second panel data associated with the second market;
- weight the third panel data associated with the second market to determine weighted third panel data associated with the second market, the third panel data to be weighed based on the demographic weighting controls obtained for the first market; and
- determine the third behavioral distribution based on the weighted third panel data associated with the second market.

5. The computing system of claim 2, wherein the machine readable instructions further cause, when executed by the at least one processor, the computing system to calibrate a first value of a first category in the first behavioral distribution based on a corresponding second value of the first category in the second behavioral distribution and a corresponding third value of the first category in the third behavioral distribution to determine a calibrated first value of the first category in the first behavioral distribution.

6. The computing system of claim 5, wherein the machine readable instructions further cause, when executed by the at least one processor, the computing system to multiply the first value of the first category in the first behavioral distribution by a ratio of the second value of the first category in the second behavioral distribution divided by the third value of the first category in the third behavioral distribution to determine the calibrated first value of the first category.

7. The computing system of claim 6, wherein the machine readable instructions further cause, when executed by the at least one processor, the computing system to normalize a result of multiplication of the first value of the first category in the first behavioral distribution by the ratio of the second value of the first category in the second behavioral distribution divided by the third value of the first category in the third behavioral distribution to determine the calibrated first value of the first category.

8. At least one non-transitory computer readable medium comprising computer readable instructions that, upon execution by one or more processors of a computing system, cause the computing system to at least:
- communicate with a first monitoring system that is to monitor online media served in a first market to obtain first panel data associated with the first market and a first measurement period, demographic characteristics of the first panel data to be unknown or unverified;
- communicate with a second monitoring system that is to monitor online media served in a second market to obtain second panel data associated with the second market and the first measurement period, demographic characteristics of the second panel data to be unknown or unverified;
- communicate with a plurality of meters that are to monitor compute devices in the second market to obtain third panel data associated with the second market and the first measurement period, demographic characteristics of the third panel data to be known;
- calibrate the first panel data associated with the first market based on the second panel data associated with the second market and the third panel data associated with the second market to determine calibrated first panel data associated with the first market; and
- output the calibrated first panel data associated with the first market to a downstream measurement process to be performed by an audience measurement system to determine an audience estimate for the online media served in the first market.

9. The at least one non-transitory computer readable medium of claim 8, wherein the computer readable instructions further cause, upon execution by the one or more processors, the computing system to:
- calibrate a first behavioral distribution determined from the first panel data to determine a calibrated first behavioral distribution, the first behavior distribution to be calibrated based on a second behavioral distribution determined from the second panel data and a third behavioral distribution determined from the third panel data; and
- calibrate the first panel data based on the calibrated first behavioral distribution.

10. The at least one non-transitory computer readable medium of claim 9, wherein the computer readable instructions further cause, upon execution by the one or more processors, the computing system to:
- weight the first panel data associated with the first market to determine weighted first panel data associated with the first market, the first panel data to be weighted based on demographic weighting controls; and
- determine the first behavioral distribution based on the weighted first panel data associated with the first market.

11. The at least one non-transitory computer readable medium of claim 10, wherein the computer readable instructions further cause, upon execution by the one or more processors, the computing system to:
- weight the second panel data associated with the second market to determine weighted second panel data associated with the second market, the second panel data to be weighted based on the demographic weighting controls obtained for the first market;
- determine the second behavioral distribution based on the weighted second panel data associated with the second market;
- weight the third panel data associated with the second market to determine weighted third panel data associated with the second market, the third panel data to be weighed based on the demographic weighting controls obtained for the first market; and
- determine the third behavioral distribution based on the weighted third panel data associated with the second market.

12. The at least one non-transitory computer readable medium of claim 9, wherein the computer readable instructions further cause, upon execution by the one or more processors, the computing system to calibrate a first value of a first category in the first behavioral distribution based on a corresponding second value of the first category in the second behavioral distribution and a corresponding third value of the first category in the third behavioral distribution to determine a calibrated first value of the first category in the first behavioral distribution.

13. The at least one non-transitory computer readable medium of claim 12, wherein the computer readable instructions further cause, upon execution by the one or more processors, the computing system to multiply the first value of the first category in the first behavioral distribution by a ratio of the second value of the first category in the second behavioral distribution divided by the third value of the first category in the third behavioral distribution to determine the calibrated first value of the first category.

14. The at least one non-transitory computer readable medium of claim 13, wherein the computer readable instructions further cause, upon execution by the one or more processors, the computing system to normalize a result of multiplication of the first value of the first category in the first behavioral distribution by the ratio of the second value of the first category in the second behavioral distribution divided by the third value of the first category in the third behavioral distribution to determine the calibrated first value of the first category.

15. A method comprising:
communicating with a first monitoring system that monitors online media served in a first market to obtain first panel data associated with the first market and a first measurement period, demographic characteristics of the first panel data being unknown or unverified;
communicating with a second monitoring system that monitors online media served in a second market to obtain second panel data associated with the second market and the first measurement period, demographic characteristics of the second panel data being unknown or unverified;
communicating with a plurality of meters that monitor compute devices in the second market to obtain third panel data associated with the second market and the first measurement period, demographic characteristics of the third panel data being known;
calibrating the first panel data associated with the first market based on the second panel data associated with the second market and the third panel data associated with the second market to determine calibrated first panel data associated with the first market; and
outputting the calibrated first panel data associated with the first market to a downstream measurement process performed by an audience measurement system to determine an audience estimate for the online media served in the first market.

16. The method of claim 15, further including:
calibrating a first behavioral distribution determined from the first panel data to determine a calibrated first behavioral distribution, the calibrating based on a second behavioral distribution determined from the second panel data and a third behavioral distribution determined from the third panel data; and
calibrating the first panel data based on the calibrated first behavioral distribution.

17. The method of claim 16, further including:
weighting the first panel data associated with the first market to determine weighted first panel data associated with the first market, the first panel data to be weighted based on demographic weighting controls; and
determining the first behavioral distribution based on the weighted first panel data associated with the first market.

18. The method of claim 17, further including:
weighting the second panel data associated with the second market to determine weighted second panel data associated with the second market, the weighting based on the demographic weighting controls obtained for the first market;
determining the second behavioral distribution based on the weighted second panel data associated with the second market;
weighting the third panel data associated with the second market to determine weighted third panel data associated with the second market, the weighing based on the demographic weighting controls obtained for the first market; and
determining the third behavioral distribution based on the weighted third panel data associated with the second market.

19. The method of claim 16, wherein the calibrating of the first behavioral distribution includes calibrating a first value of a first category in the first behavioral distribution based on a corresponding second value of the first category in the second behavioral distribution and a corresponding third value of the first category in the third behavioral distribution to determine a calibrated first value of the first category in the first behavioral distribution.

20. The method of claim 19, wherein the calibrating of the first value of the first category in the first behavioral distribution includes multiplying the first value of the first category in the first behavioral distribution by a ratio of the second value of the first category in the second behavioral distribution divided by the third value of the first category in the third behavioral distribution to determine the calibrated first value of the first category.

* * * * *